US012007085B2

(12) United States Patent
Zhang

(10) Patent No.: US 12,007,085 B2
(45) Date of Patent: Jun. 11, 2024

(54) LIGHT STRING

(71) Applicant: Gemmy Industries Corp., Coppell, TX (US)

(72) Inventor: Cheng-Chun Zhang, Shenzhen (CN)

(73) Assignee: GEMMY INDUSTRIES CORP., Coppell, TX (US)

( * ) Notice: Subject to any disclaimer, the term of this patent is extended or adjusted under 35 U.S.C. 154(b) by 0 days.

(21) Appl. No.: 17/956,494

(22) Filed: Sep. 29, 2022

(65) Prior Publication Data

US 2024/0027036 A1 Jan. 25, 2024

Related U.S. Application Data

(60) Provisional application No. 63/390,541, filed on Jul. 19, 2022.

(51) Int. Cl.

*F21S 4/10* (2016.01)
*F21V 21/096* (2006.01)
*F21V 21/26* (2006.01)

(52) U.S. Cl.

CPC ................ *F21S 4/10* (2016.01); *F21V 21/26* (2013.01); *F21V 21/096* (2013.01)

(58) Field of Classification Search

CPC ..... F21S 4/10; F21S 4/15; F21S 2/005; F21V 23/001; F21V 23/002; F21V 23/06; F21V 21/096; F21V 21/0965; F21V 21/26; F21V 21/30; F21V 21/108; F21V 21/32; F21V 21/005; F21V 21/008; F21V 14/025; F21V 14/02; F21V 14/06; F21V 33/006; F21V 33/0076; F21V 17/02; F21V 19/02; F21V 15/01

See application file for complete search history.

(56) References Cited

U.S. PATENT DOCUMENTS

| | | | | | |
|---|---|---|---|---|---|
| 1,232,824 | A * | 7/1917 | Mayhew | F21L 4/06 | 362/202 |
| 4,219,869 | A * | 8/1980 | Bowman | F21S 8/06 | 362/147 |
| 4,495,550 | A * | 1/1985 | Visciano | F21V 21/32 | 362/186 |
| 5,091,836 | A * | 2/1992 | Neustadt | F21V 21/08 | 362/407 |
| 5,295,055 | A * | 3/1994 | Brock | F21V 21/092 | 362/249.14 |
| 5,584,574 | A * | 12/1996 | Haddad | F21V 21/30 | 362/442 |
| 5,599,091 | A * | 2/1997 | Kira | F21V 21/30 | 362/427 |

(Continued)

FOREIGN PATENT DOCUMENTS

WO 98/55711 A1 12/1998

*Primary Examiner* — Peggy A Neils
*Assistant Examiner* — James M Endo
(74) *Attorney, Agent, or Firm* — Squire Patton Boggs (US) LLP

(57) ABSTRACT

A light string includes a plurality of lights, each light of the plurality of lights having a base, a periscope extending from the base, a lighting module coupled to the periscope, and a power cord serially connecting the plurality of lights. The periscope is configured to rotate with respect to the base to direct a light emanating from the lighting module in a desired direction. A lighting system includes the light string.

22 Claims, 42 Drawing Sheets

(56) References Cited

U.S. PATENT DOCUMENTS

| | | | | | |
|---|---|---|---|---|---|
| 6,045,239 | A * | 4/2000 | Waldmann | F16M 11/06 | 362/418 |
| 6,100,803 | A * | 8/2000 | Chang | G08B 13/19 | 250/221 |
| 6,231,215 | B1 * | 5/2001 | Spitler | F21V 21/30 | 362/396 |
| 6,817,733 | B2 * | 11/2004 | Frei | F21S 6/001 | 362/249.06 |
| 6,902,200 | B1 * | 6/2005 | Beadle | F16M 13/02 | 362/427 |
| 7,320,537 | B1 * | 1/2008 | Stillwaugh | F21L 14/02 | 362/398 |
| 7,367,697 | B2 | 5/2008 | George | | |
| 8,915,609 | B1 | 12/2014 | Shah et al. | | |
| 9,964,291 | B1 * | 5/2018 | Del Rio | F21V 21/096 | |
| 10,088,134 | B1 | 10/2018 | Helms et al. | | |
| 10,156,777 | B1 * | 12/2018 | Altamura | F21S 4/10 | |
| 10,228,114 | B1 * | 3/2019 | Payton | F21V 21/096 | |
| 10,247,384 | B1 * | 4/2019 | Feinbloom | F21V 17/12 | |
| 10,344,956 | B2 | 7/2019 | Hess | | |
| 10,871,276 | B1 * | 12/2020 | Lan | F21V 17/002 | |
| 11,060,706 | B1 * | 7/2021 | Rivera | F21V 21/096 | |
| 11,258,219 | B2 | 2/2022 | Yu | | |
| 2004/0202506 | A1 * | 10/2004 | Lazic | F16M 11/12 | 403/97 |
| 2006/0012980 | A1 * | 1/2006 | Mize | F21V 21/32 | 362/198 |
| 2006/0227575 | A1 * | 10/2006 | Powers | H01R 33/955 | 362/650 |
| 2007/0030672 | A1 * | 2/2007 | Offiler | F21L 4/04 | 362/396 |
| 2009/0040774 | A1 * | 2/2009 | Avila | F21S 8/036 | 362/371 |
| 2009/0196034 | A1 * | 8/2009 | Gherardini | F21V 21/005 | 362/235 |
| 2009/0237921 | A1 * | 9/2009 | Lee | F21S 6/003 | 362/249.04 |
| 2010/0328953 | A1 * | 12/2010 | Wu | F21S 4/10 | 362/249.14 |
| 2011/0038159 | A1 * | 2/2011 | Carlson | F21S 4/10 | 362/249.16 |
| 2012/0007516 | A1 * | 1/2012 | Lax | F21S 2/00 | 315/312 |
| 2012/0033415 | A1 * | 2/2012 | Sharrah | F21V 21/0965 | 362/199 |
| 2012/0075862 | A1 * | 3/2012 | Garcia | F21S 4/10 | 362/249.16 |
| 2012/0280098 | A1 * | 11/2012 | Rinck | F21V 17/105 | 248/304 |
| 2013/0201658 | A1 * | 8/2013 | Bogart | F21V 15/00 | 362/95 |
| 2013/0201702 | A1 * | 8/2013 | Wallon | F21V 23/06 | 362/418 |
| 2014/0340903 | A1 * | 11/2014 | Mahr | F21V 23/001 | 362/249.08 |
| 2014/0376226 | A1 * | 12/2014 | Tsao | G09F 13/22 | 362/237 |
| 2015/0159844 | A1 * | 6/2015 | Flaherty | F21S 4/10 | 362/249.02 |
| 2015/0176780 | A1 * | 6/2015 | Sun | F21V 23/0414 | 362/189 |
| 2015/0184841 | A1 * | 7/2015 | Liu | F21V 21/30 | 362/270 |
| 2015/0308616 | A1 * | 10/2015 | Abbott | F21S 4/10 | 248/206.5 |
| 2016/0018070 | A1 * | 1/2016 | Van Deursen | F21V 23/0414 | 362/191 |
| 2016/0061432 | A1 * | 3/2016 | Bogart | H05B 45/382 | 315/201 |
| 2017/0363274 | A1 * | 12/2017 | Hsu | F21V 17/162 | |
| 2018/0020530 | A1 * | 1/2018 | Scordato | F21V 29/70 | |
| 2019/0063697 | A1 * | 2/2019 | Lan | F21S 2/005 | |
| 2019/0113217 | A1 * | 4/2019 | Lan | F21V 23/06 | |
| 2019/0195477 | A1 * | 6/2019 | Garvin | F21V 21/096 | |
| 2019/0212005 | A1 * | 7/2019 | Lan | F21V 29/77 | |
| 2020/0032986 | A1 * | 1/2020 | Zhang | F21V 23/001 | |
| 2020/0109837 | A1 * | 4/2020 | Wenzel | F21V 21/0885 | |
| 2020/0200343 | A1 * | 6/2020 | Chen | H05B 47/19 | |

* cited by examiner

LIGHT STRING

CROSS-REFERENCE TO RELATED APPLICATIONS

This application claims priority to U.S. Provisional Application No. 63/390,541, filed Jul. 19, 2022, which is hereby incorporated by reference in its entirety.

TECHNICAL FIELD

The present disclosure relates to a lighting string. In particular, the present disclosure relates to a lighting string with a periscope.

BACKGROUND

A light string includes multiple light bulbs. The light bulbs are serially connected by a power cord. The power cord is electrically connected to a plug. The plug is connected to an external power source to provide electrical power to the light string. The light string is installed for illumination and can be installed outside or inside a building.

BRIEF SUMMARY

According to an embodiment, a light string includes a plurality of lights, each light of the plurality of lights having a base having a main surface and a bottom surface, a periscope extending from a bottom surface of the base, and a lighting module coupled to a distal end of the periscope, and a power cord serially connecting the plurality of lights, wherein at least a portion of the periscope is configured to hinge, pivot, or rotate with respect to the base to direct a light emanating from the lighting module in a desired direction.

According to an embodiment, the light further includes a magnet embedded into the base, the magnet configured to secure the light to an external surface.

According to an embodiment, each light further includes a mounting assembly configured to releasably secure the light to an external surface.

According to an embodiment, the periscope is a flexible tube.

According to an embodiment, the periscope is shaped as an L-shaped bend.

According to an embodiment, the periscope has a first section connected to a second section and an angle defined between the first section and the second section.

According to an embodiment, the angle is 90 degrees.

According to an embodiment, the angle is between 80 degrees and 100 degrees.

According to an embodiment, the light string further includes a hinge at a connection between the first section and the second section.

According to an embodiment, the hinge is configured to change the angle.

According to an embodiment, the hinge further including a hinge member located between the first section and the second section, the hinge member configured to travel between grooves within an interior of the second section to pivot the second section with respect to the first section.

According to an embodiment, the hinge further including two flanges formed on the second section, a protrusion formed on the first section extending between the two flanges, and a rod extend through the two flanges and the protrusion, second section configured to pivot with respect to the first section about the rod.

According to an embodiment, the periscope is configured to rotate 180 degrees.

According to an embodiment, the periscope includes a first section and a second section, and wherein the second section is configured to pivot or hinge with respect to the first section and the base.

According to an embodiment the first section is configured to rotate with respect to the base.

According to an embodiment, the lighting module is located at a first distal end of the periscope and the periscope is connected to the base at a second distal end.

According to an embodiment, the lighting module includes one or more LEDs.

According to an embodiment, the light string further includes a lens coupled to the lighting module.

According to an embodiment, the lens is replaceable.

According to an embodiment, the lens is faceted, conical, or substantially flat.

According to an embodiment, the light string further includes a printed circuit board within the base, the printed circuit board configured to control the lighting module.

According to an embodiment, the printed circuit board is water proof.

According to an embodiment, the printed circuit board is controllable with a computer application and/or via voice command.

According to an embodiment, the periscope rotates with respect to the base and has a hinge allowing for the periscope to hinge with respect to itself.

According to an embodiment, a lighting system includes a light string and a mounting assembly configured to releasably secure the light string to an external surface.

According to an embodiment, the lighting system further includes a second light string and a connector configured to couple the second light string to the light string.

According to an embodiment, the light string and the second light string have different lenses.

According to an embodiment, the light string and the second light string have the same lenses.

According to an embodiment, the light string is configured to couple to a soffit or a gutter.

According to an embodiment, a light string includes a plurality of lights, each light of the plurality of lights having a periscope and a lighting module coupled to a distal end of the periscope, and a power cord serially connecting the plurality of lights, wherein the periscope is moveable between two or more positions including a first position where the lighting module faces in a first direction and a second position where the lighting module faces a second direction, the second direction being different than the first direction.

According to an embodiment, the second direction is 180 degrees from the first direction.

According to an embodiment, further including a rotation assembly, wherein the periscope is movable between the first position and the second position via rotation of the rotation assembly with respect to a base of the light.

According to an embodiment, wherein the periscope is movable between the first position and the second position via a hinge configured to allow a first portion of the periscope to pivot or hinge with respect to a second portion of the periscope.

According to an embodiment, further including a rotation assembly and a hinge, the periscope movable between the first position and the second position via the rotation assembly, the hinge, or both.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The term "side" as used herein may refer to a surface, wall, edge, border, boundary, etc., or simply to a general position or location with respect to the described component (e.g., not referring to any physical component).

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

The light strings of the present disclosure provide lights that may be releasably and detachably coupled to an outdoor location in manner that hides or obscures the wires and control units of the lights. Additionally, the periscope or "bent pipe" feature, referred to herein interchangeably, of the lights allows for directing the light in a desired direction to either enhance illumination or provide a subdued illumination effect. The light string of the present disclosure, thus, allows for year round customization of outdoor lighting. The light string may be app controlled and/or voice controlled to allow for ease of control and manipulation of the various lighting effects and colors. The light string of the present disclosure may be mounted to any number of surfaces, either indoor or outdoor, including walls, buildings, exterior building walls, interior walls, gutters, soffits, etc. The light string of the present disclosure may be permanently mounted or removably mounted.

Figure 1:
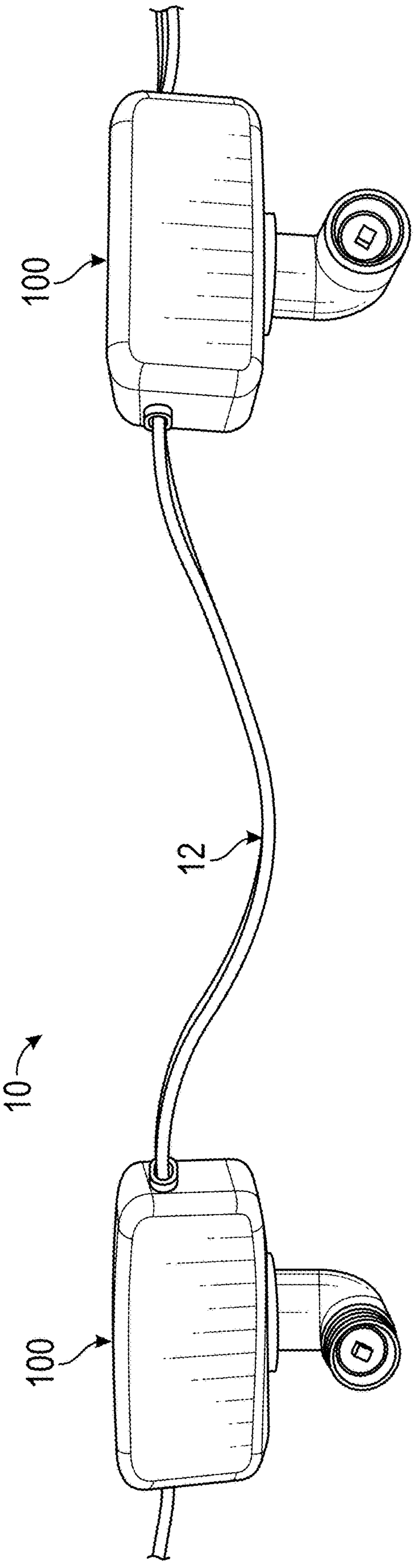
FIG. 1 illustrates a view of a light string, according to an embodiment of the present disclosure.

FIG. 1 illustrates a light string 10 having one or more lights 100 coupled together with a power cord 12. Although two lights 100 are illustrated, more or fewer may be provided. The power cord 12 may include a first connection (not shown) on one end for coupling to a power outlet and a second connection (not shown) on an opposing end for coupling to another light string. The light string 10 may operate on battery, AC power, and/or DC power. The lenses are omitted from the lights 100 for clarity, but are understood to be included as described herein.

Figure 2A:
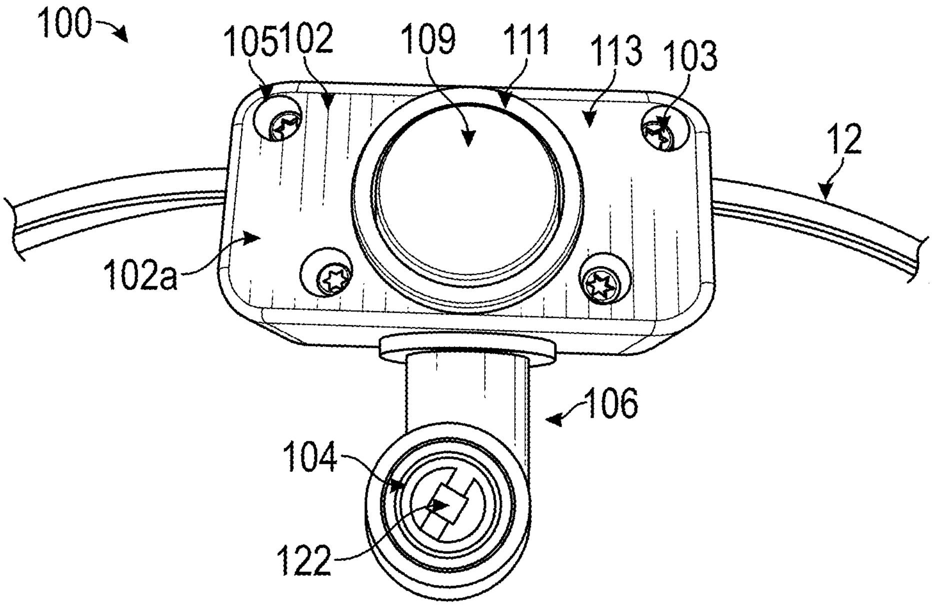
FIG. 2A illustrates a view of a light for a light string, according to an embodiment of the present disclosure.
Figure 2B:
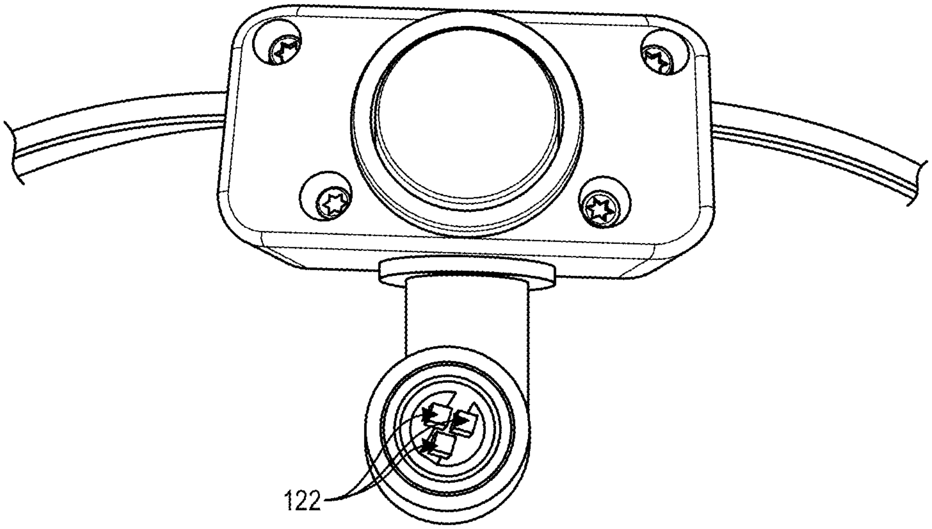
FIG. 2B illustrates a view of a light for a light string, according to an embodiment of the present disclosure.
Figure 3:
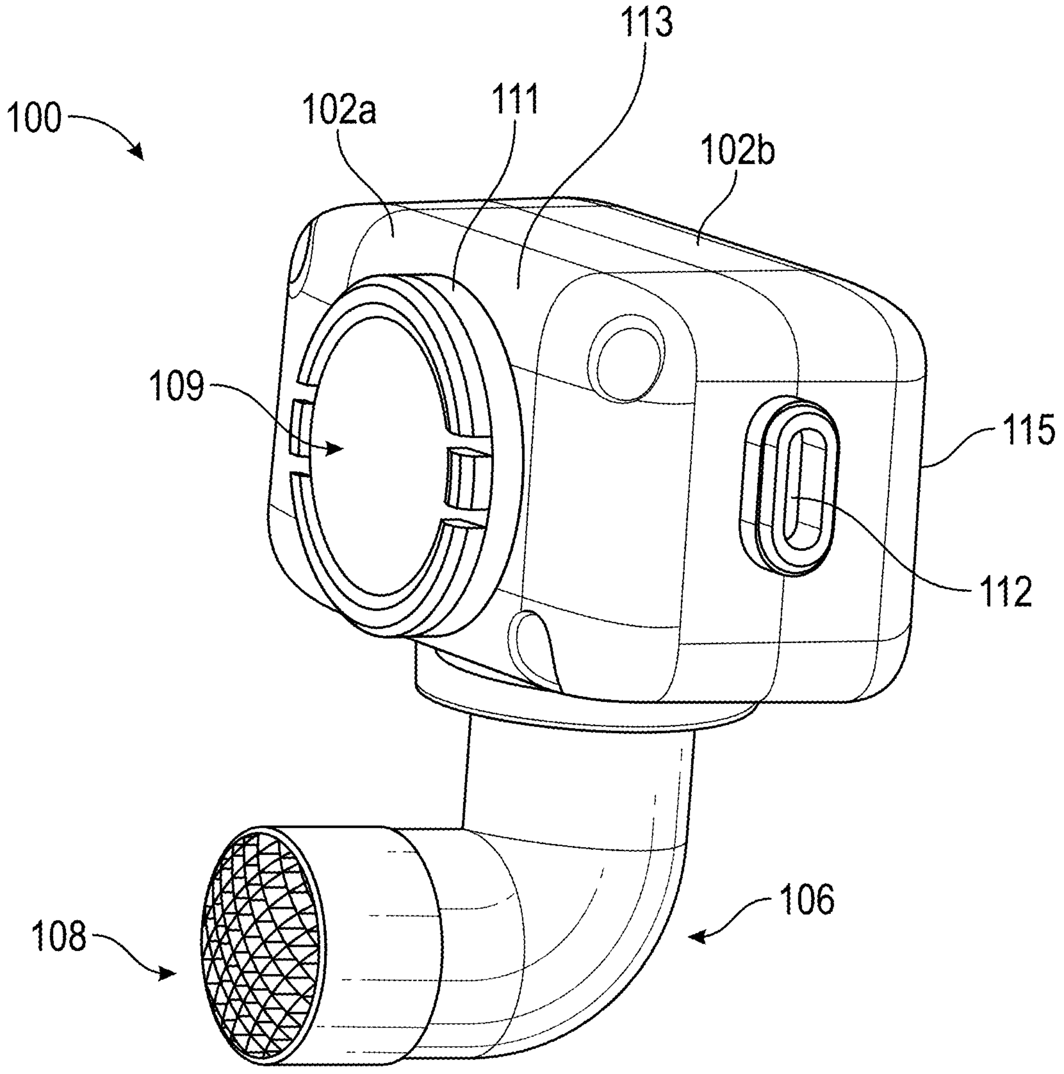
FIG. 3 illustrates a perspective view the light of FIG. 2A, according to an embodiment of the present disclosure.

FIGS. 2A to 9 illustrate an exemplary light 100 of the light string 10 (FIG. 1). The light 100 has a base 102, a lighting module 104, a periscope 106, and a lens 108 (FIG. 3). The base 102 may be a housing to house various components of the light 100. The lens 108 is shown in FIG. 3 as a substantially flat, faceted lens, having only a slight curvature in the lens, however other shapes, such as, for example, the bulbous lens 208 of FIG. 10, are contemplated. The lens 108 may be any lens that provides a desired lighting effect for the lights provided on the lighting module 104. For example, the lens 108 may be faceted, may be colored, may be shaped, may be a projection lens, etc., or combinations thereof.

Figure 4:
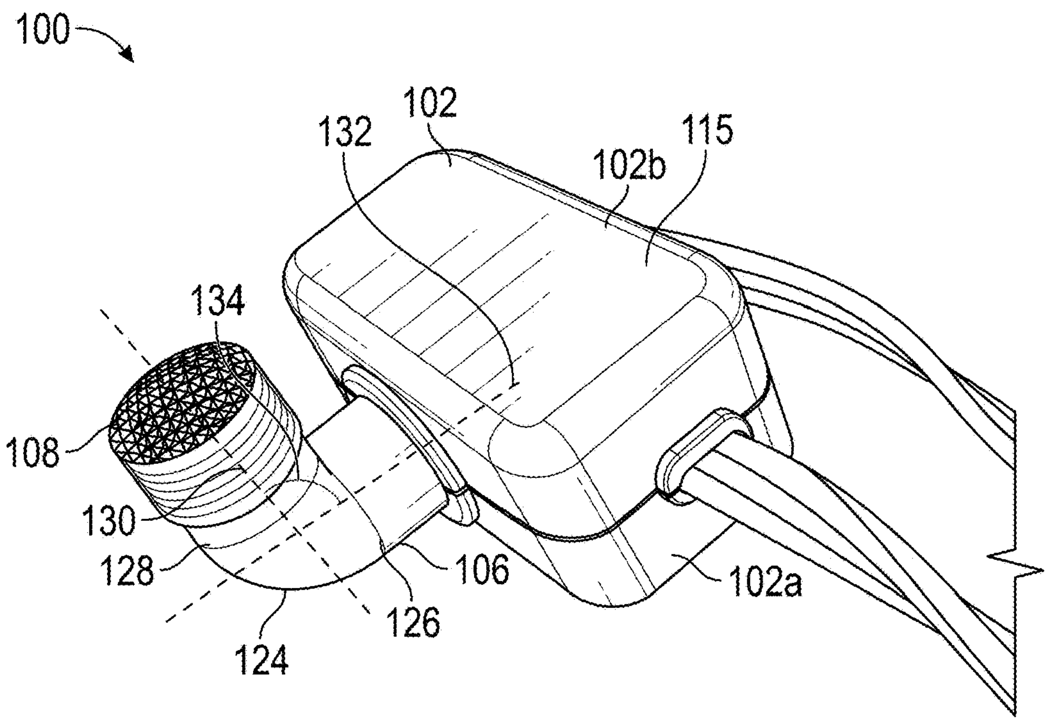
FIG. 4 illustrates a perspective view the light of FIG. 2A, according to an embodiment of the present disclosure.
Figure 6:
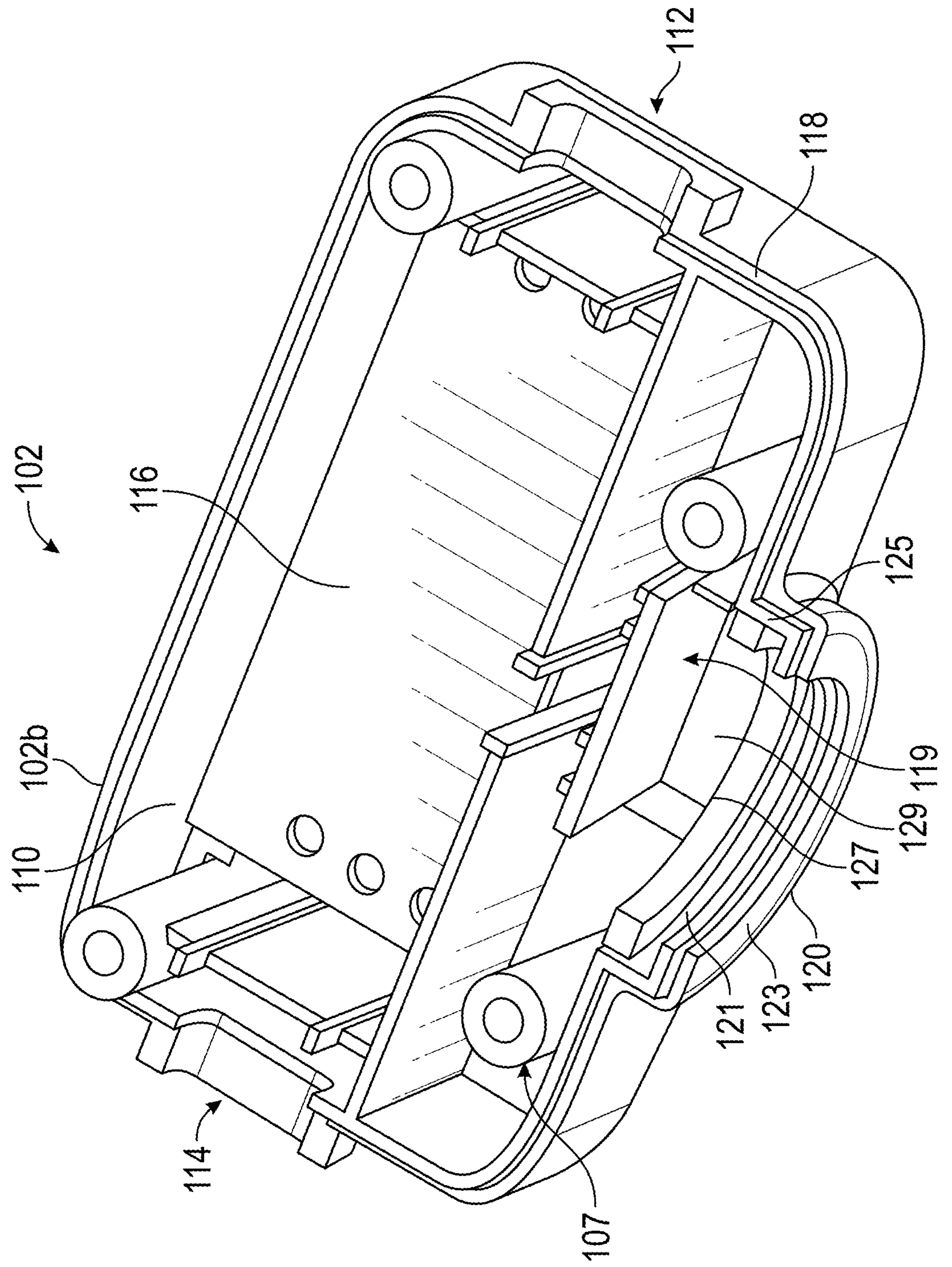
FIG. 6 illustrates a perspective view of a base for the light of FIG. 2A, according to an embodiment of the present disclosure.

Referring to FIGS. 2A to 4, the base 102 may be formed of a first base member **102*a* and a second base member 102*b*. The base 102 is shown as a rectangular prism formed of two halves (102*a*, 102*b*) that are each a substantially hollow rectangular prism. However, other three-dimensional shapes are contemplated, including cube, sphere, cylinder, pyramid, cone, triangular prim, ovoid, or other polyhedrons. One or more fasteners 103 may secure the first base member 102*a* to the second base member 102*b*. The one or more fasteners 103 may extend through openings 105 in the first base member 102*a* into receiving portions 107 (FIG. 6) on the second base member 102*b* (FIG. 6). Although 4 fasteners 103 and receiving portions 107 are shown, more or fewer may be provided. As seen in FIG. 4, the openings 105 may be omitted from the second base member 102*b*. Various features of the light 100 may be housed within the substantially hollow interior of the base 102**.

As shown in FIG. 2A, the first base member **102*a* may have a magnet 109 embedded within an interior space 117 (FIG. 7) of a protrusion 111** extending from a main surface 113 of the first base member 102*a*. The magnet 109 may allow for the light 100 to be removably, detachably, and/or temporarily connected to a surface, as will be described in more detail to follow. The magnet 109 may be secured within the protrusion 111, such as, for example, with an adhesive or one or more fastening devices (e.g., as described with respect to FIG. 21).

Referring back to FIG. 2A, the light 100 also includes the lighting module 104. The lighting module 104 may include one or more lights 122, which may be light emitting diodes (LEDs). The lighting module 104 may be wired to a printed circuit board (PCB) 116 (FIG. 6) such that the one or more lights 122 may be controlled by the PCB 116. For example, the PCB 116 may control the one or more lights 122 to turn on, change color, have a lighting effect (steady on, flashing, blinking, etc.), etc. FIG. 2A illustrates a single light 122 and FIG. 2B illustrates three lights 122, however, more or fewer are contemplated.

FIGS. 2A to 5 also illustrate the periscope 106 of the light 100. Referring in particular to FIG. 4, the periscope 106 includes a body 124. The body 124 is illustrated in a generally "bent pipe" configuration. That is, the body 124 has an upper tube or first section 126 and a lower tube or second section 128. The first section 126 has a central, longitudinal axis 130 and the second section 128 has a central, longitudinal axis 132. An angle 134 is formed between the longitudinal axis 130 and the longitudinal axis 132. As shown, the angle 134 may be 90 degrees. However, other angles are contemplated, including, for example, an angle between 0 degrees and 180 degrees. In some examples, the angle 134 is between 80 degrees and 100 degrees. In some examples, the angle 134 is 30 degrees, the angle 134 is 45 degrees, the angle 134 is 60 degrees, the angle 134 is 90 degrees, the angle 134 is 120 degrees, or the angle 134 is 150 degrees. In some examples, the second section 128 is omitted and only the first section 126 extends from the base 102. In such examples, a lens (e.g., lens 108) is provided on a side surface (e.g., the curved surface) of the second section 128 such that rotation of the periscope 106 changes the direction at which the lens faces, as will be described herein. In some examples, the first section 126 and the second section 128 may be fixed or integrally formed such that no relative movement is permitted therebetween. In some examples, the first section 126 and the second section 128 are hinged such that the second section 128 may be pivoted with respect to the first section 126 to change the angle 134 therebetween.

Figure 5:
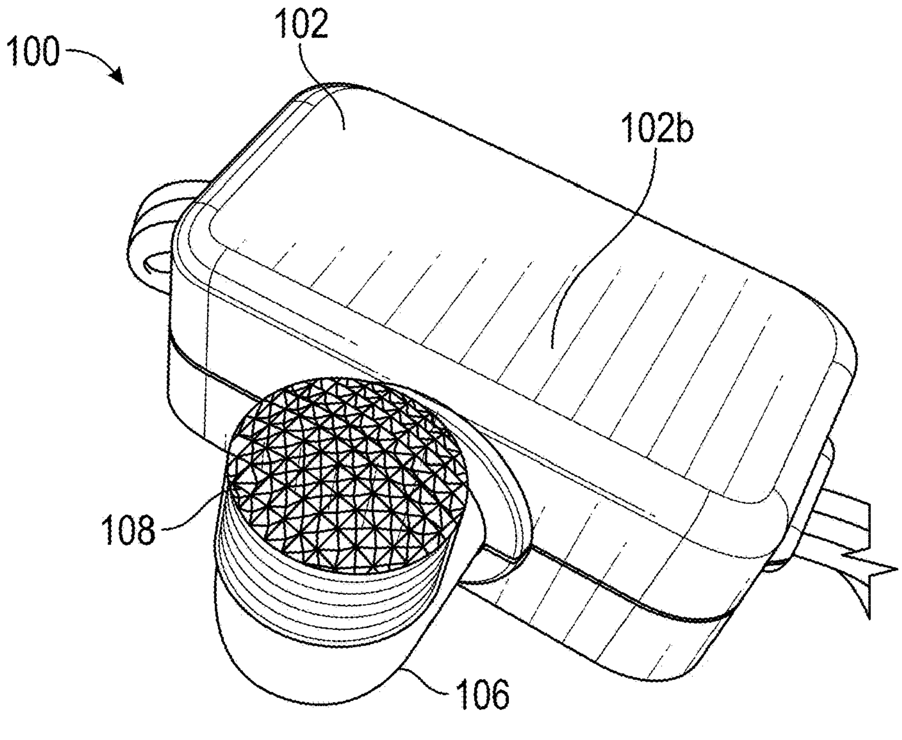
FIG. 5 illustrates a perspective view the light of FIG. 2A, according to an embodiment of the present disclosure.
Figure 8:
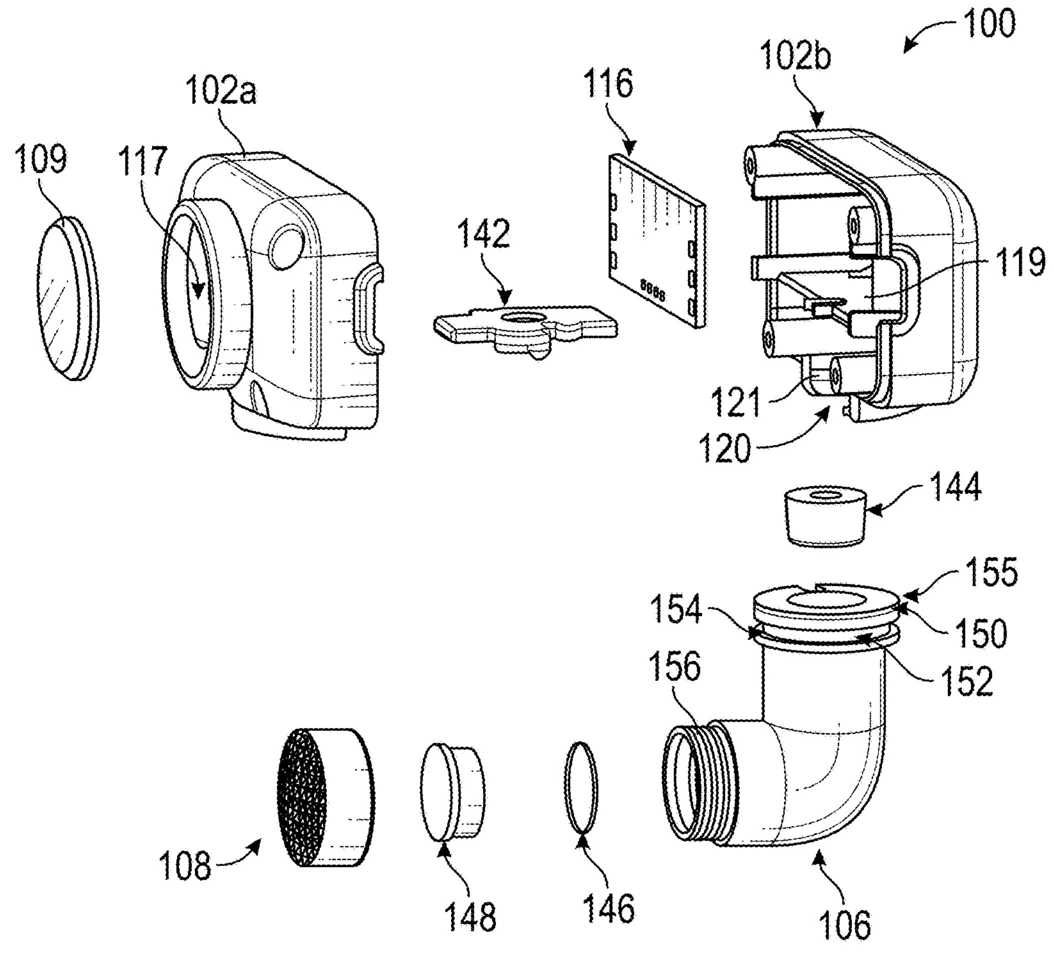
FIG. 8 illustrates an exploded view of the light of FIG. 2A, according to an embodiment of the present disclosure.
Figure 9:
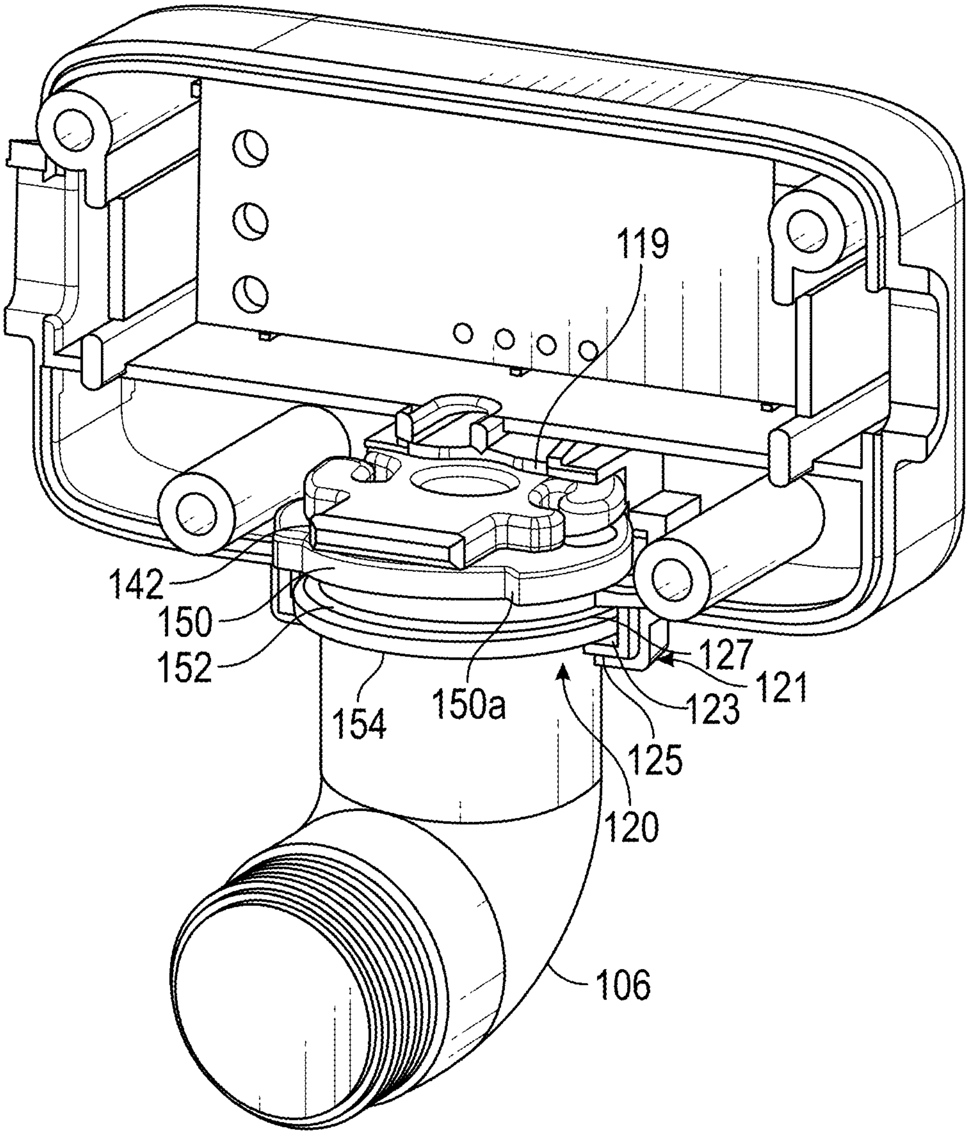
FIG. 9 illustrates a perspective partial view of the light of FIG. 2A, with the lens, removed, according to an embodiment of the present disclosure.
Figure 10:
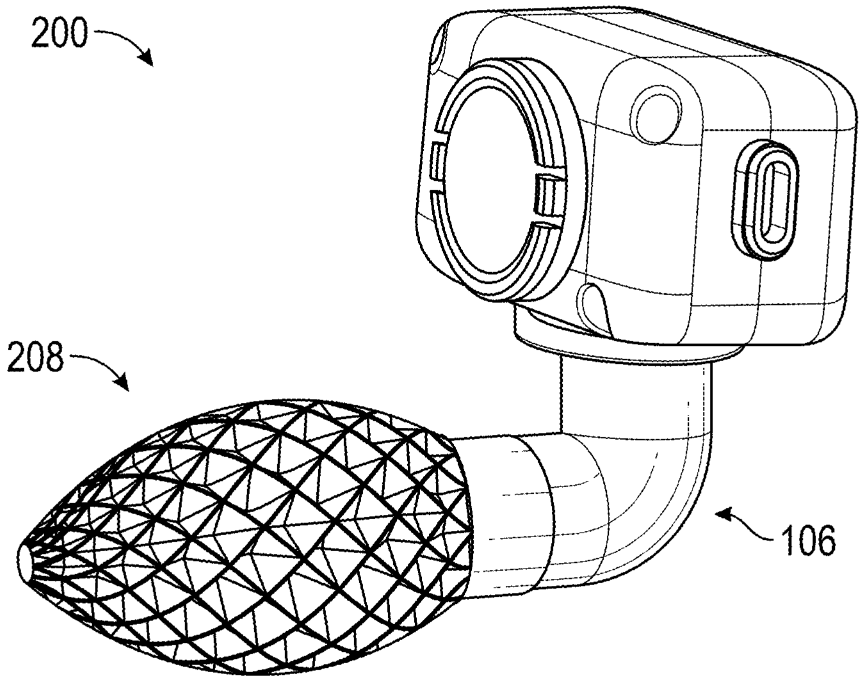
FIG. 10 illustrates a perspective view of a light for a light string in a first position, according to an embodiment of the present disclosure.

Referring to FIGS. 6, 8, and 9, the base 102 is described in more detail. FIG. 6 illustrates the second base member 102*b* of the base 102, but as shown in FIG. 8, the first base member 102*a* may include similar or the same features. Each of the first base member 102*a* and the second base member 102*b* may have a substantially hollow interior 110. The substantially hollow interior 110 may contain one or more components of the base 102 and/or one or more components of the light 100. For example, the power cord 12 (omitted for clarity) may extend from a first opening 112 through the hollow interior 110 of the base 102 to a second opening 114. A first opening, a second opening, and a hollow interior may be provided on the first base member 102*a* in the same or similar manner as on the second base member 102*b* such that, when assembled to form the base 102, the openings and interiors of the first base member 102*a* and the second base member 102*b* align. The printed circuit board (PCB) 116 may be included in the hollow interior 110. Although omitted for clarity, wires or cables may couple the PCB 116 to the lighting module 104 (FIG. 2A) and the power cord 12 (FIG. 2A). The PCB 116 may be waterproof. A lip 118 may be formed on each of the first base member 102*a* and the second base member 102*b*. The lips 118 of the two halves may be mating faces such that, when aligned, the first base member 102*a* and the second base member 102*b* form a housing, such as shown in FIGS. 4 and 5. An adhesive, glue, and/or a seal may be provided on or near the lip 118. Glue may be applied to the first base member 102*a* and the second base member 102*b* to secure the two halves together. The fasteners 103 are optional and may be omitted. When secured together with fasteners 103 and/or adhesive/glue, the base 102 may be watertight and sealed against intrusion of water. Additionally, or alternatively, the PCB 116 may be waterproof and is suitable for continued outdoor use. This allows for the light string to be suitable for continued outdoor use.

With continued reference to FIGS. 6, 8, and 9, a periscope opening 120 is included in each of the first base member 102*a* and the second base member 102*b*. When assembled, the two halves of the base 102 form a substantially cylindrical periscope opening 120. The periscope opening 120 receives the periscope 106 (FIG. 4), which is described in more detail to follow. Although shown as cylindrical, the periscope opening 120 may be any shape that conforms to the shape of the periscope 106 or any shape that allows rotation of the periscope 106 within the periscope opening 120. Each half of the periscope opening 120 (e.g., on both the first base member 102*a* and the second base member 102*b*), there may be a first shoulder 123, a second shoulder 125, and a third shoulder 127. The first shoulder 123 and the second shoulder 125 may be formed by the body of the base 102. The first shoulder 123 and the second shoulder 125 may be semi-circular in shape. A first groove 121 is located between the second shoulder 125 and the third shoulder 127. A second groove 129 is located between the third shoulder 127 and a protrusion 119. The protrusion 119 extends within the hollow interior 110. The aforementioned interior structure also for rotation of the periscope 106.

Figure 11:
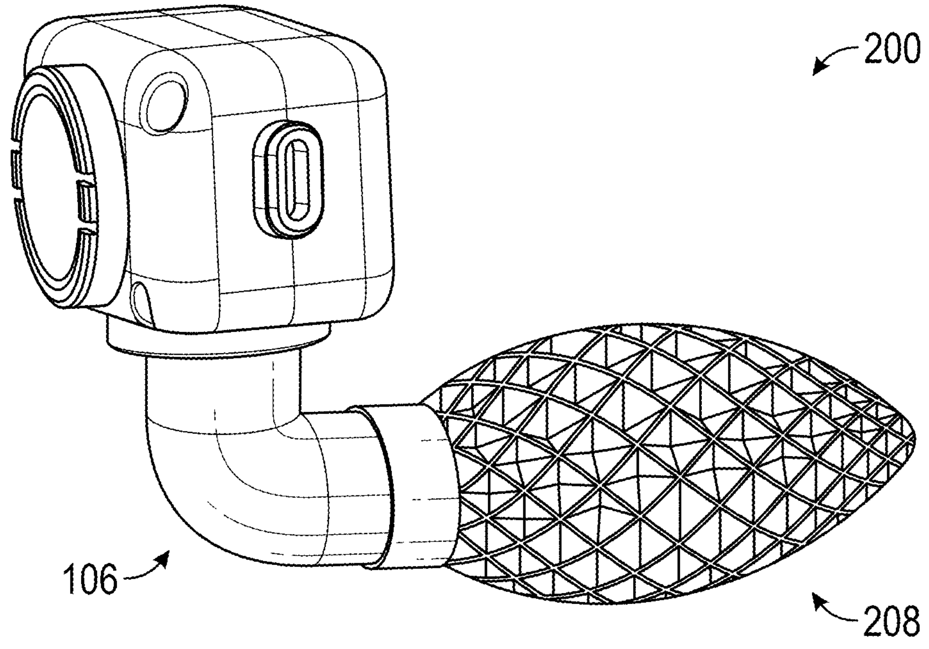
FIG. 11 illustrates a perspective view of the light of FIG. 10 in a second position, according to an embodiment of the present disclosure.

The periscope 106 may be rotated, pivoted, or swiveled about the longitudinal axis 132 via rotation assembly 155 with respect to the base 102. The periscope 106 may be rotated 360 degrees about the longitudinal axis 132 in any increment of degrees. This allows for the lights 122 to be directed in any desired direction about the longitudinal axis 132. For example, as shown in FIG. 2A, the periscope 106 is rotated such that lights 122 face away from the main surface 113 of the first base member 102*a*, and, as shown in FIG. 4, the periscope 106 is rotated such that the lights 122 face away from a main surface 115 of the second base member 120*b*. Thus, the periscope 106 can be rotated 180 degrees within the periscope opening 120 (FIG. 6) from a first position shown in FIG. 2A to a second position shown in FIG. 4 (See also, FIGS. and 11 which illustrate the rotation of the periscope 106). Although shown as rotated 180 degrees, more or fewer degrees of rotation may be provided. A locking mechanism may be provided to maintain the periscope in the desired position. The rotation of the periscope with respect to the base 102 allows for the base 102 to be securely mounted to a surface while the light may be directed in different locations. FIGS. 10 and 11 also illustrate the rotation of the periscope 106 (but with a different lens illustrated). As is appreciated from FIGS. 10 and 11, the base does not move during rotation of the periscope such that the base remains secured to the surface and the light is pointing in another direction.

As shown in FIGS. 6, 8, and 9, the periscope opening 120 includes the first groove 121 and the second groove 129. A first flange 154 (FIG. 9) on the periscope 106 may be received within the first groove 121 and a second flange 150 (FIG. 9) on the periscope 106 may be received within the second groove 129. The second flange 150 (FIG. 9) is also referred to as a rotation block. The third shoulder 127 of the base 102 may receive a groove 152 on the periscope 106. In this manner, the periscope 106 may be prohibited or prevented from moving longitudinal or laterally with respect to the base 102 (e.g., due to the flanges on either side of the first groove 121), but may be permitted to rotate 360 degrees within the periscope opening 120. That is, the first flange 154 and the second flange 150 are capable of relative rotation within the first groove 121 and the second groove 129.

FIGS. 8 and 9 further illustrate additional components of the light 100. A member 142 is located within the base 102. The member 142 may secure the second flange 150 within the periscope opening 120. The light 100 includes a waterproof plug 144, a waterproof ring 146, and an inner waterproof lens 148. The waterproof plug 144, the waterproof ring 146, and the inner waterproof lens 148 prevents, reduces, or limits the ingress of water into the light 100. FIG. 9 further illustrates a protrusion 150*a*. The periscope 106 further includes an outer threaded surface 156 for coupling to an inner threaded surface of the lens 108, although, other connection types are contemplated.

Figure 7:
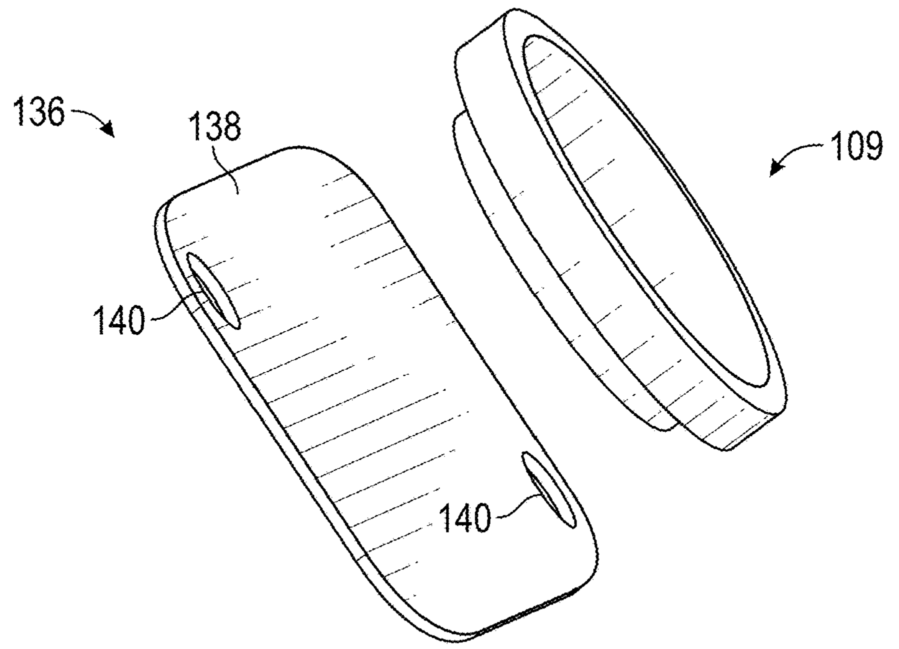
FIG. 7 illustrates a magnet assembly for the light of FIG. 2A, according to an embodiment of the present disclosure.

Referring back to FIG. 7, the light 100 includes a magnet assembly 136. The magnet assembly 136 includes the magnet 109 of the light 100 of FIG. 2A (or the magnet 609 of FIG. 21). The magnet assembly 136 also includes a metal plate 138. The metal plate 138 may be mounted to a surface (e.g., such as an interior or exterior wall of a house, a gutter, eaves of a roof, etc.). The metal plate 138 may be mounted with double sided tape, an adhesive, glue, one or more hook and loop fasteners, or one or more fasteners, or combinations thereof. Where fasteners are used, one or more openings 140 may be provided for the fasteners. The one or more openings 140 are optional and may be omitted. The magnet 109 may secure to the metal plate 138 via magnetic attraction, as is well-known in the art. Although shown without the base 102 solely for clarity, it may be appreciated that the magnet 109 shown in FIG. 7 is secured to the base 102 as previously described. In this manner, the base 102 (FIG. 2A) may be removable and detachably secured to a surface via the metal plate 138. Although shown as generally rectangular, other shapes of the metal plate 138 are contemplated. Accordingly, each light may have a magnet backing for coupling to a metal piece with mounting mechanism (e.g., double stick tape) on the opposing side that works with the light. This allows for easy and convenient installation of the light string.

FIGS. 10 and 11 illustrate another light 200, which is the same as the light 100, except for the lens 208. Therefore, like numerals or unlabeled features are understood to be the same as those like numbered or like illustrated features in FIGS. 2A to 7. The lens 208 is substantially conical in shape. The lens 208 is faceted. The lens 208 may be similar to a traditional Christmas bulb. As described previously, and as shown in FIGS. 10 and 11, the periscope 106 may rotate 180 degrees such that the lens 208 has a first position shown in FIG. 10 and a second position shown in FIG. 11. Although not shown, interim positions between the positions of FIG. 10 and FIG. 11 are possible.

Figure 12:
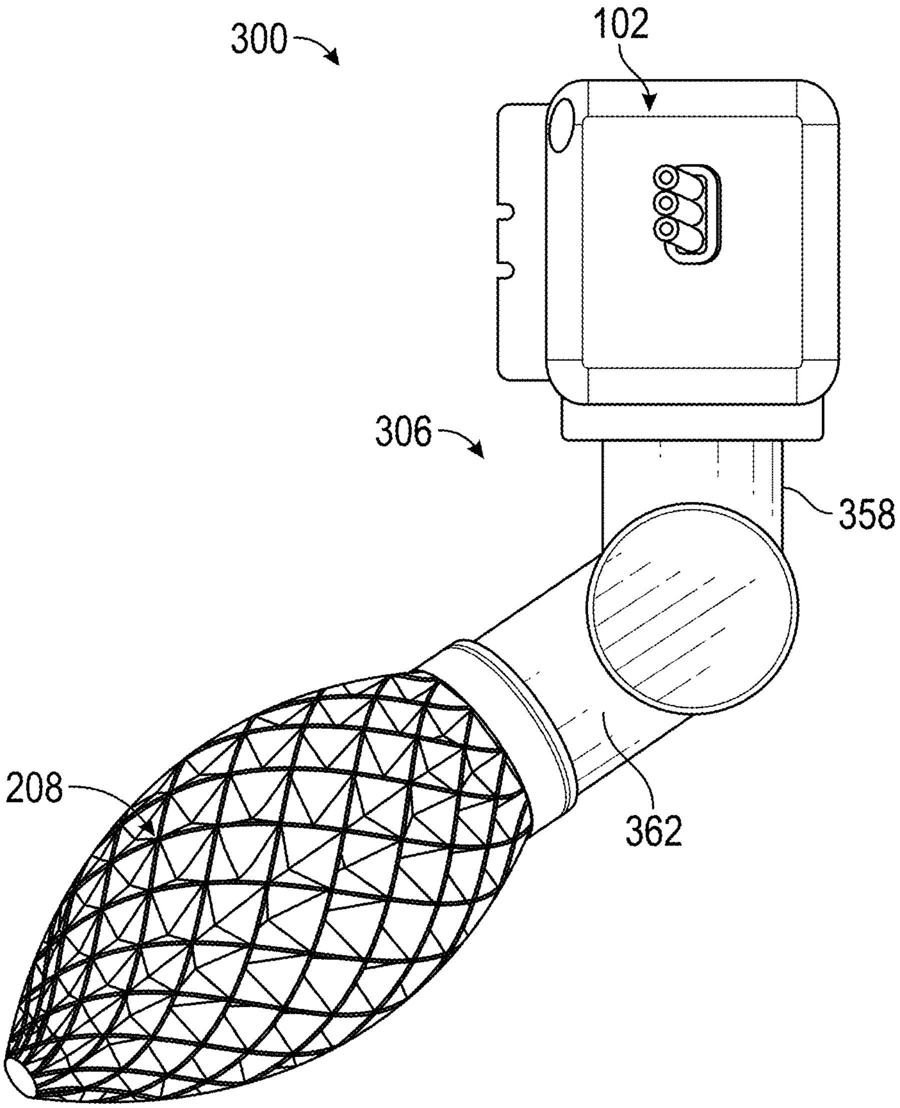
FIG. 12 illustrates a side view of a light, according to an embodiment of the present disclosure.
Figure 13:
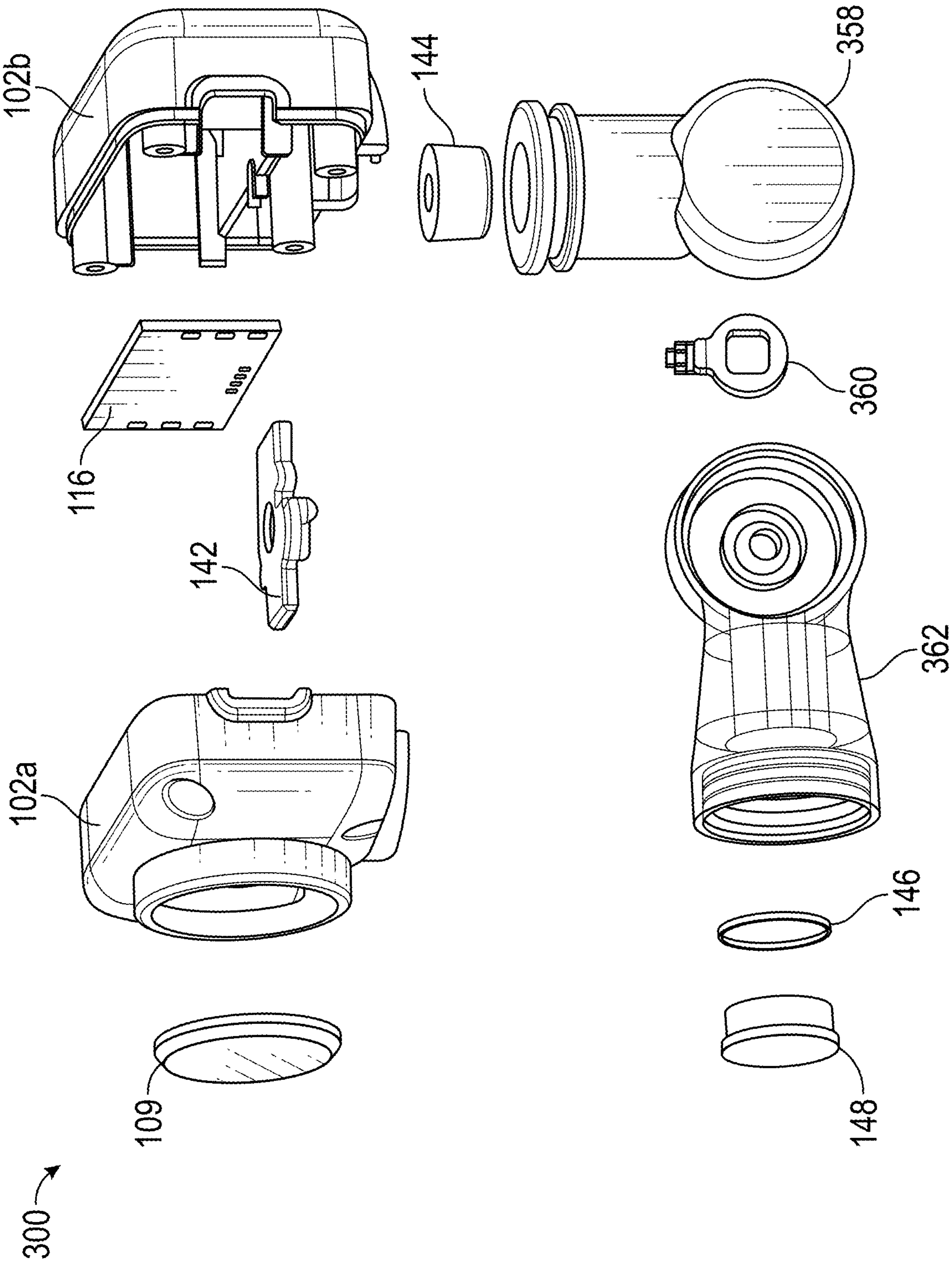
FIG. 13 illustrates an exploded view of the light of FIG. 12, according to an embodiment of the present disclosure.

FIGS. 12 to 18C illustrate an exemplary light 300. The light 300 includes the base 102 and the lens 208 described previously. The difference in FIG. 12 as compared to prior embodiments is the periscope 306. In FIGS. 12 and 13, the periscope 306 is configured to bend or pivot at a hinge point between an upper tube or first section 358 and a lower tube or second section 362. The hinge member 360 facilitates the pivoting or bending at the hinge point.

Figure 14:
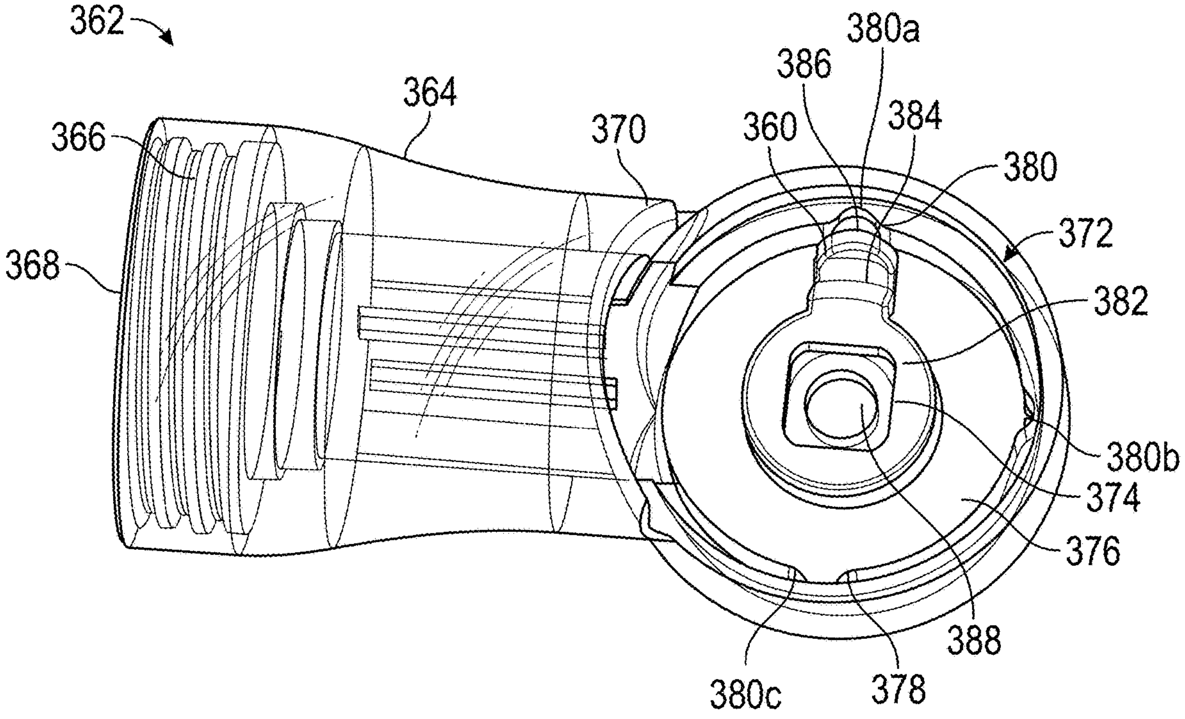
FIG. 14 illustrates a perspective view of a lower tube of the light of FIG. 12, according to an embodiment of the present disclosure.

FIG. 14 illustrates a perspective view of the second section 362. The second section 362 includes a body 364 having a distal first end 368 for coupling to a lens (e.g., the lens 108 or the lens 208 or other lens). Internal threads 366 are provided within the body 364 of the second section 362 to cooperate with external threads (not shown) on the lens. The body 364 may be substantially tubular from the first end 368 to the second end 370. Coupled to the tubular body 364 at the second end 370 is a disc-like member 372, The member 372 includes a recessed portion 376 surrounded by a lip 378. Formed in the lip 378 are a plurality of grooves 380. In a center of the recessed portion 376 is a second section protrusion 374 with an opening 388 therethrough. The hinge member 360 has a body 384 with an opening 382 which receives the second section protrusion 374. The hinge member 360 also includes a hinge protrusion 386.

During operation the hinge member 360 is configured to rotate around the second section protrusion 374 within the recessed portion 376. The hinge protrusion 386 is configured to rest or sit within the groove 380. Thus, as the hinge protrusion 386 moves between the grooves 380, different configurations of the periscope 306 are permitted. For example, a first position 380*a* may align with the 90 degree bend of FIG. 18A, the second position 380*b* may align with the vertical orientation of FIG. 18B, and the third position 380*c* may align with the opposing 90 degree bend of FIG. 18C. The interaction between the hinge protrusion 386 and the groove 380 may secure the light 100 in the desired orientation, until force from a user moving the second section 362 dislodges the hinge protrusion 386 from the groove 380.

Figure 15:
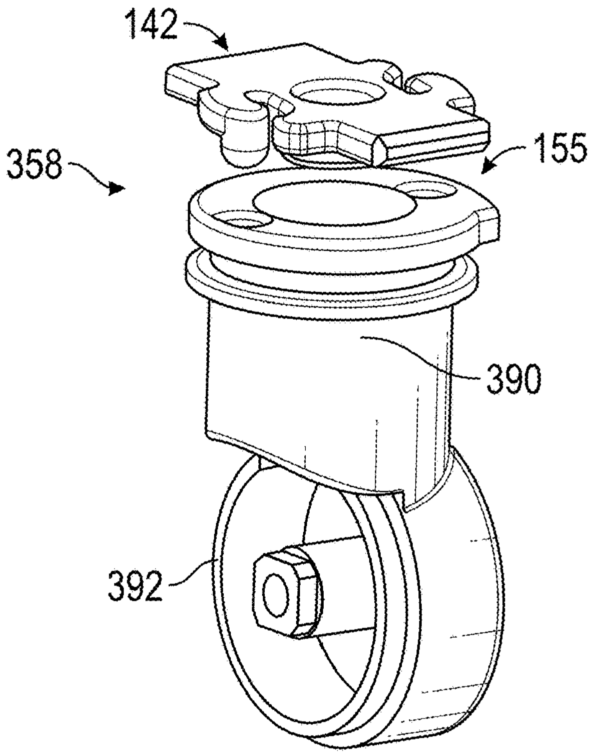
FIG. 15 illustrates a perspective view of an upper tube of the light of FIG. 12, according to an embodiment of the present disclosure.
Figure 16:
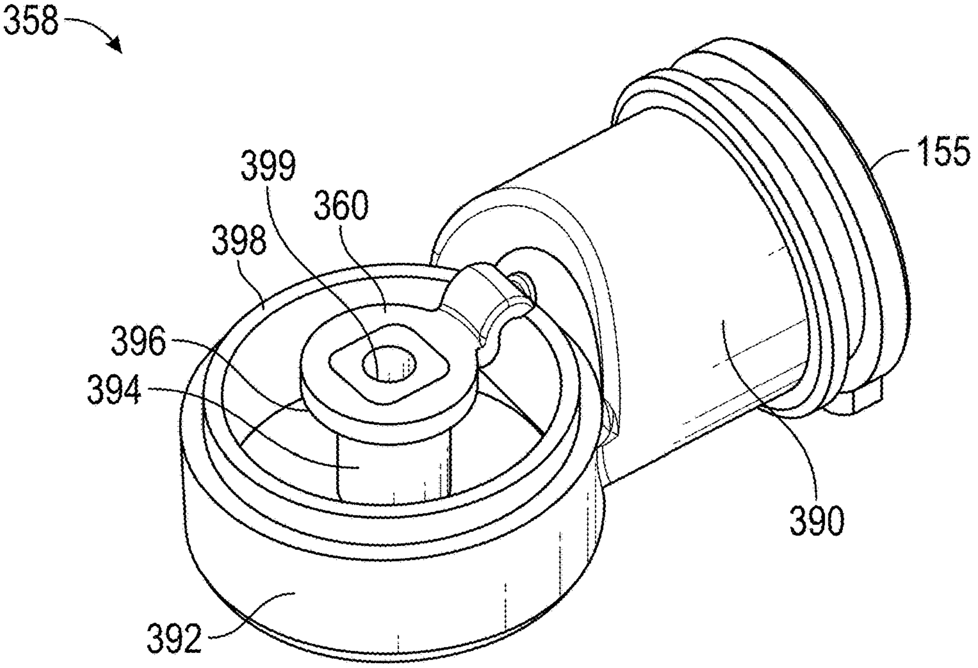
FIG. 16 illustrates a perspective view of an upper tube of the light of FIG. 12, according to an embodiment of the present disclosure.
Figure 17:
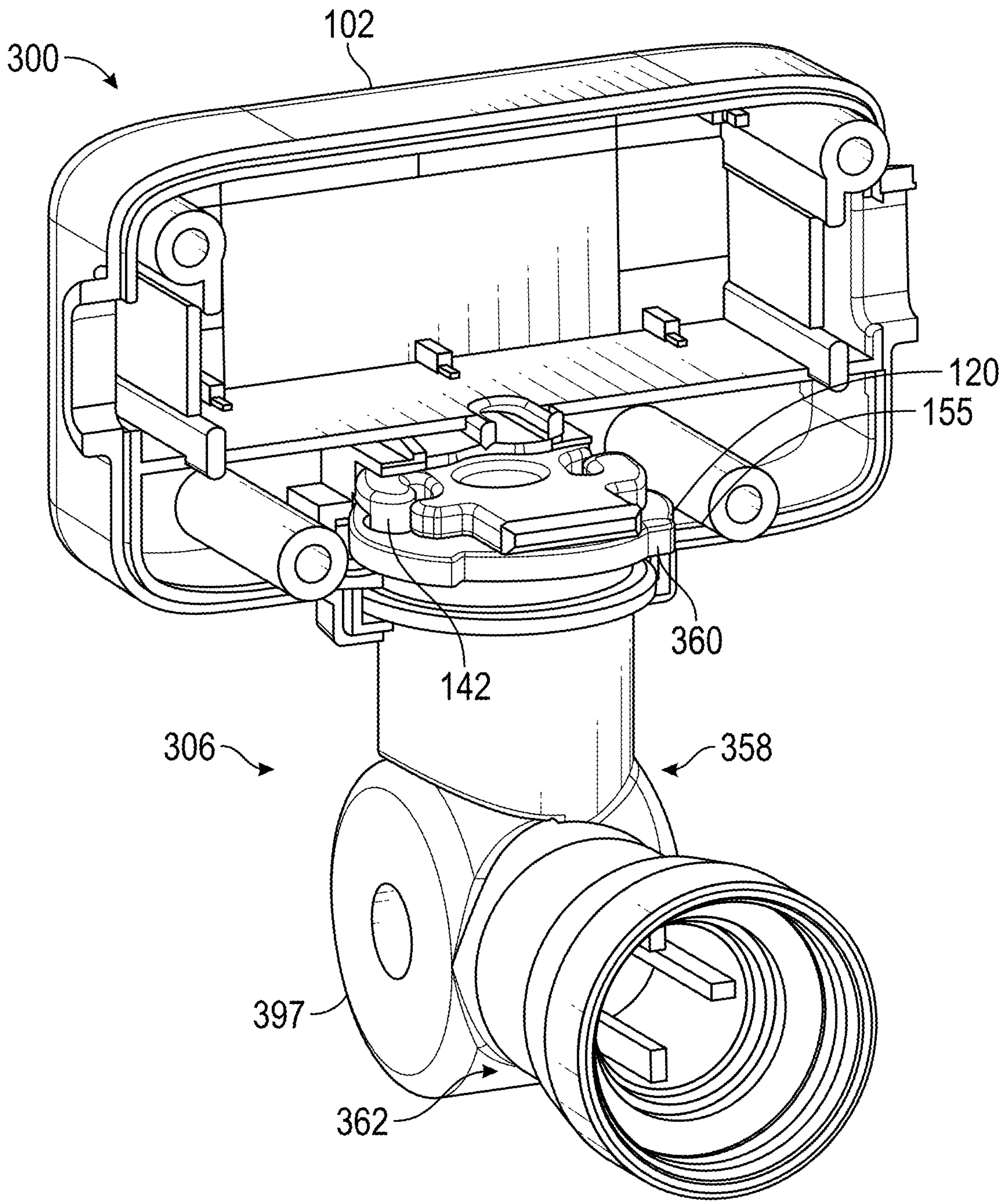
FIG. 17 illustrates a perspective partial view of the light of FIG. 12, with the lens, removed, according to an embodiment of the present disclosure.

FIGS. 15 and 16 illustrate the first section 358. The first section 358 includes a body 390 having the rotation assembly 155 at a first end a disc-like member 392 at a second end. The disc-like member 392 may be configured to mate with the disc-like member 372 of the second section 362. As shown in FIG. 16, the hinge member 360 is configured to be received on a post 394 that extends through the opening 388 of the second section 362. An opening 399 extends there through. The member 392 includes a recessed portion 396 and a wall 398. As shown in FIG. 17, the disc-like members of the first section 358 and the second section 362 mate to form a hinge point 397 that allows for pivoting or hinging of the second section 362 with respect to the first section 358 in the aforementioned manner.

Optionally, the periscope 306 may be allowed to rotate within the base 102 as described previously. This allows for numerous additional positions of the periscope. Although the periscope 306 is shown pivoting between three positions, it may be appreciated that intermediate positions are also contemplated, as well as positions extend upwards of a 90 degree bend.

Figure 18B:
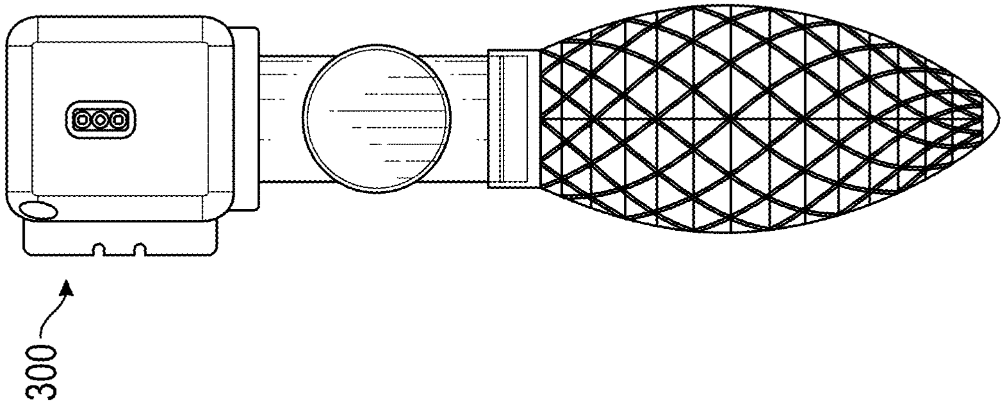
FIG. 18B illustrates a side view of the light of FIG. 12 in a second position, according to an embodiment of the present disclosure.
Figure 18A:
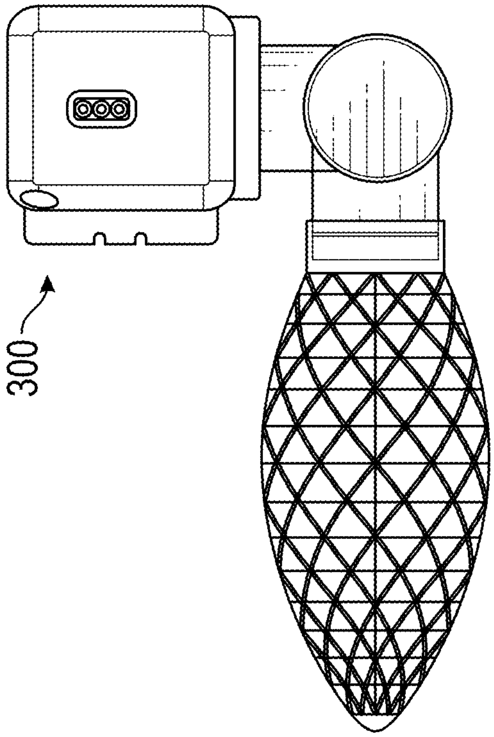
FIG. 18A illustrates a side view of the light of FIG. 12 in a first position, according to an embodiment of the present disclosure.
Figure 18C:
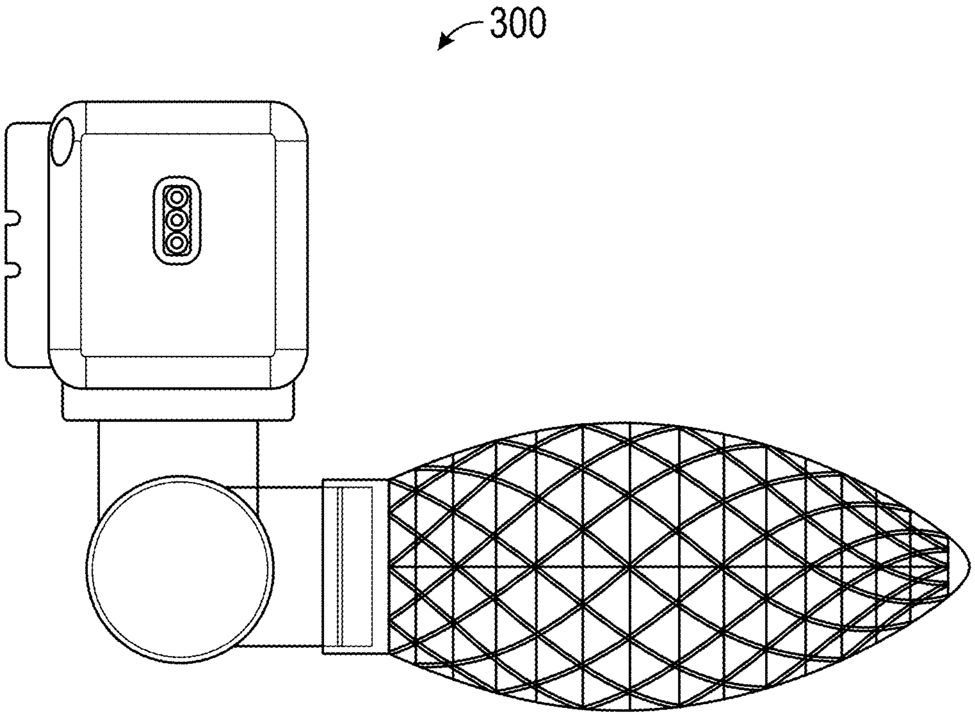
FIG. 18C illustrates a side view of the light of FIG. 12 in a third position, according to an embodiment of the present disclosure.

As mentioned previously, FIGS. 18A to 18C illustrate various positions of the exemplary light 300. In FIG. 18A, the LED and lens of the light 300 are directed towards a first direction (e.g., a direction on the same side of the magnet). The hinge previously described may allow for the LED and lens of the light 300 to be directed to another direction without moving the base of the light. For example, FIG. 18B shows a position where the LED and lens are pointed vertically downward. As can be seen, the position of the base and the position of the upper portion of the periscope have not changed, only the position of the light, lens, and a portion of the periscope. In FIG. 18C, the LED and lens of the light 300 are directed in a second direction that is 180 degrees away from the first direction. The second direction is a direction on the 180 degree opposite side of the magnet. Again, as can be seen, the position of the base has not changed. Although not shown, any direction between the first direction and the second direction may be achieved with the light.

Although FIGS. 18A to 18C illustrate the lens 208, other lens may be employed. Furthermore, although not shown, the periscope of the light 300 may also have the capability to rotate with respect to the base (as described with respect to FIGS. 2A to 9) in addition to the ability to hinge. That is, as shown in FIGS. 18A to 18C, the first section 358 does not move while the second section 362 hinges, however, rotation of the first section 358 with respect to the base is also contemplated. The first section 358 may be rotatable 360 degrees with respect to the base as described previously.

Figure 19A:
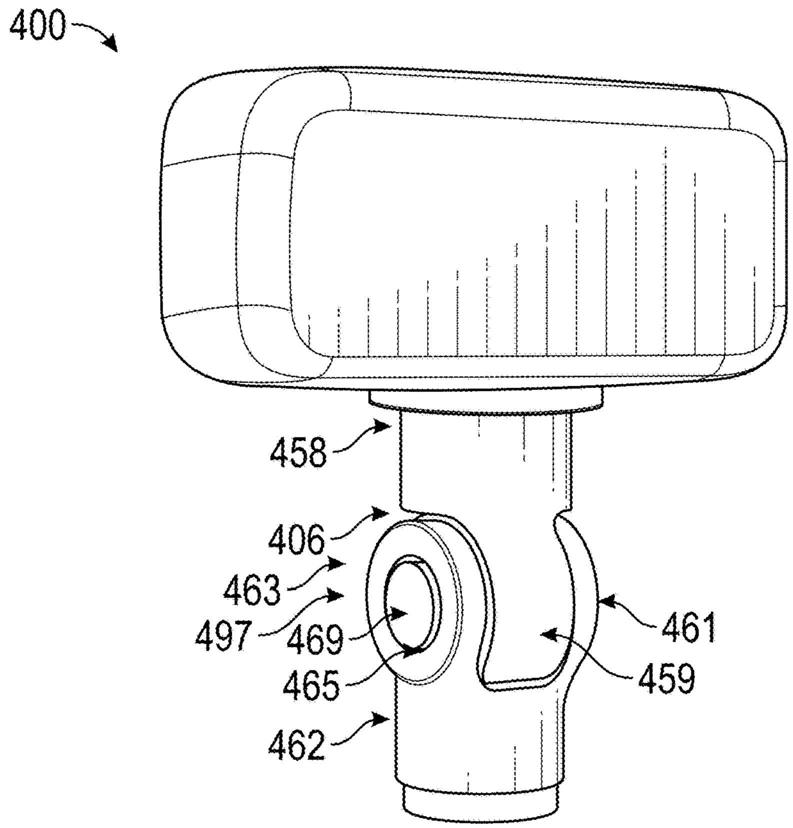
FIG. 19A illustrates a perspective view of a light in a first position, according to an embodiment of the present disclosure.
Figure 19B:
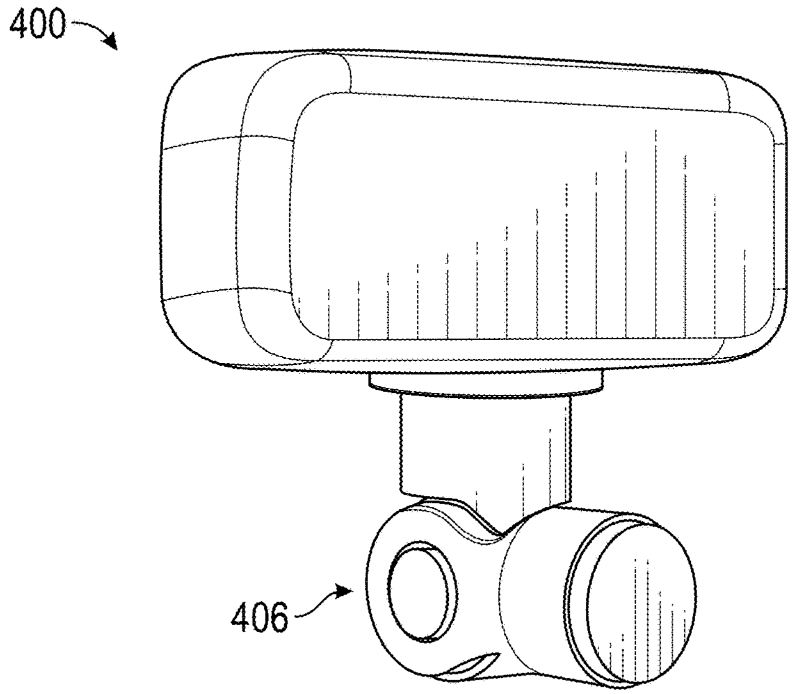
FIG. 19B illustrates a perspective view of the light of FIG. 19A in a second position, according to an embodiment of the present disclosure.
Figure 19C:
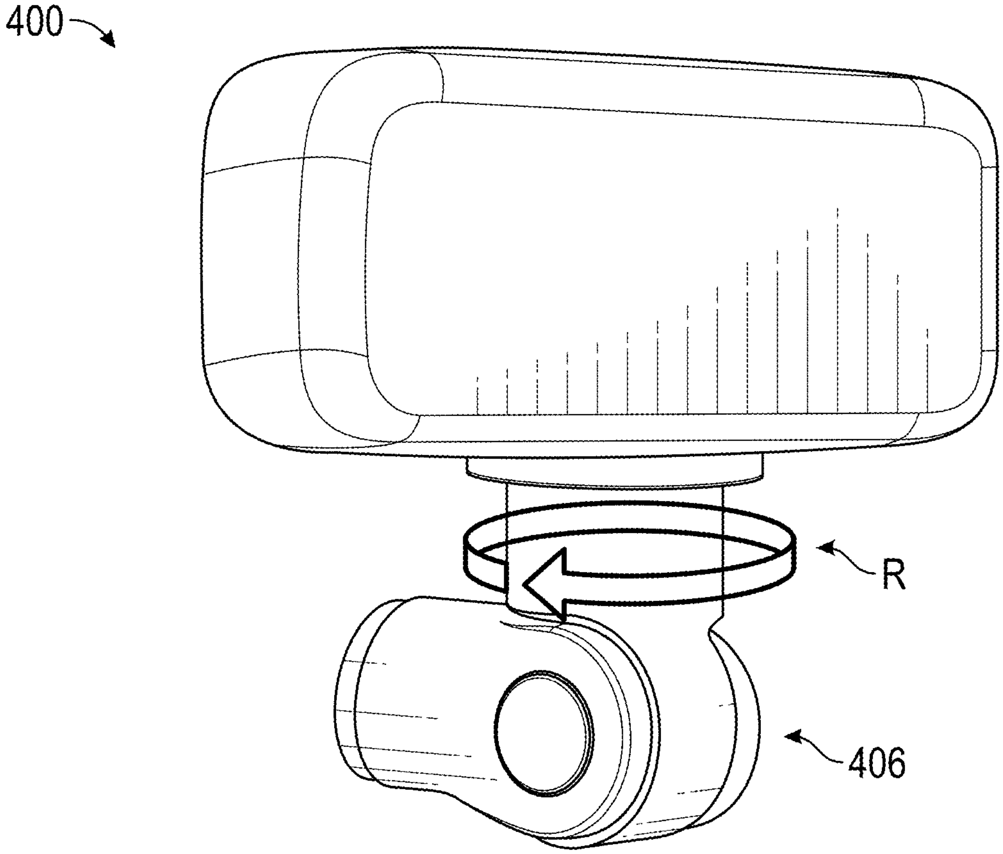
FIG. 19C illustrates a perspective view of the light of FIG. 19A in a third position, according to an embodiment of the present disclosure.

FIGS. 19A to 19C illustrate an exemplary light 400. The light 400 may be the same as or similar to the aforementioned lights, except as to the hinge point 497 and, thus, the periscope 406, which may differ from the aforementioned hinge point 397 and periscope 306. As shown in FIG. 19A, the second section 462 may include a first flange 461 and a second flange 463. A protrusion 459 of the first section 458 may be received within the space between the first flange 461 and the second flange 463. A fastener, post, or rod 469 may extend through a passage 465 in the first flange 461, the protrusion 459, and the second flange 463 to secure the first section 458 to the second section 462. The second section 462 may pivot or bend with respect to the first section 458 about the rod 469. The hinge point 497 thus allows rotation between a vertical position (FIG. 19A), a first hinged position (FIG. 19B), and a second, opposing hinged position (FIG. 19C). As shown in FIG. 19C, optionally, the periscope 406 may be allowed to rotate within the base 102 as described previously. This allows for numerous additional positions of the periscope. Although the periscope 406 is shown pivoting between three positions, it may be appreciated that intermediate positions are also contemplated, as well as positions extend upwards of a 90 degree bend.

FIGS. 20A to 20E illustrate an exemplary light 500. The light 500 may have a base 502 that is the same as, or similar to, any of the aforementioned bases. As shown, the base 502 includes the magnet attachment described with respect to FIG. 21, however other attachment methods, such as described with respect to FIG. 2A, may be employed. Although the lens 108 (FIG. 2) is illustrated, the lens 208 (FIG. 12) may also be employed, or other known lenses. The difference between the light 500 and the previously described lights may be the periscope 506. The periscope 506 may be able to hinge between the variety of positions described with respect to FIGS. 18A to 18C, and may be capable of rotating within the base 502 (via the mechanism previously described, which is not visible in FIGS. 20A to 20E).

Figure 20A:
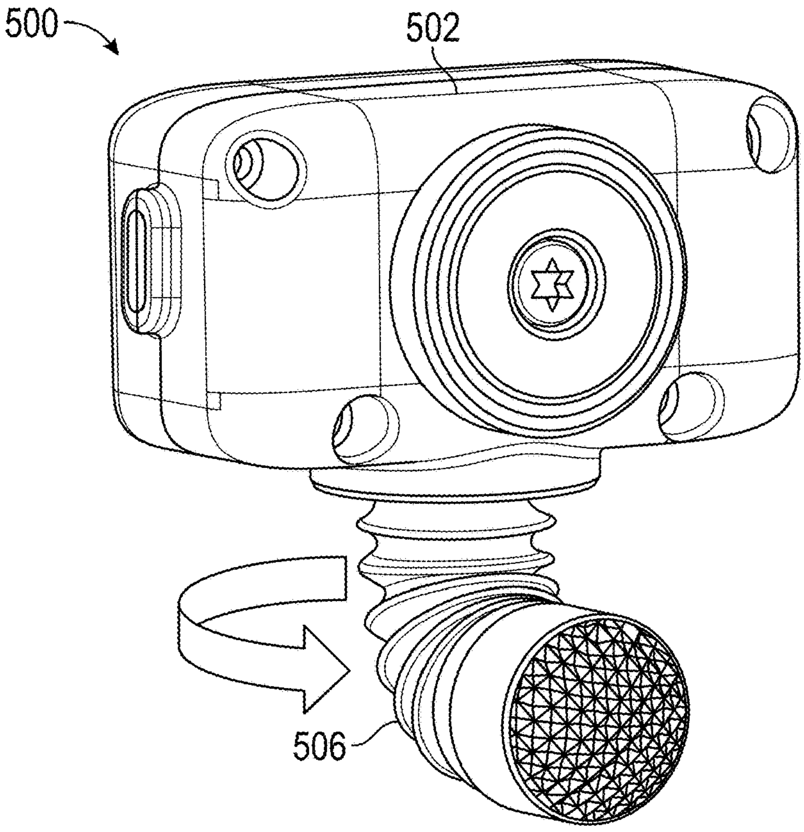
FIG. 20A illustrates a perspective view of a light, in a first position, according to an embodiment of the present disclosure.
Figure 20B:
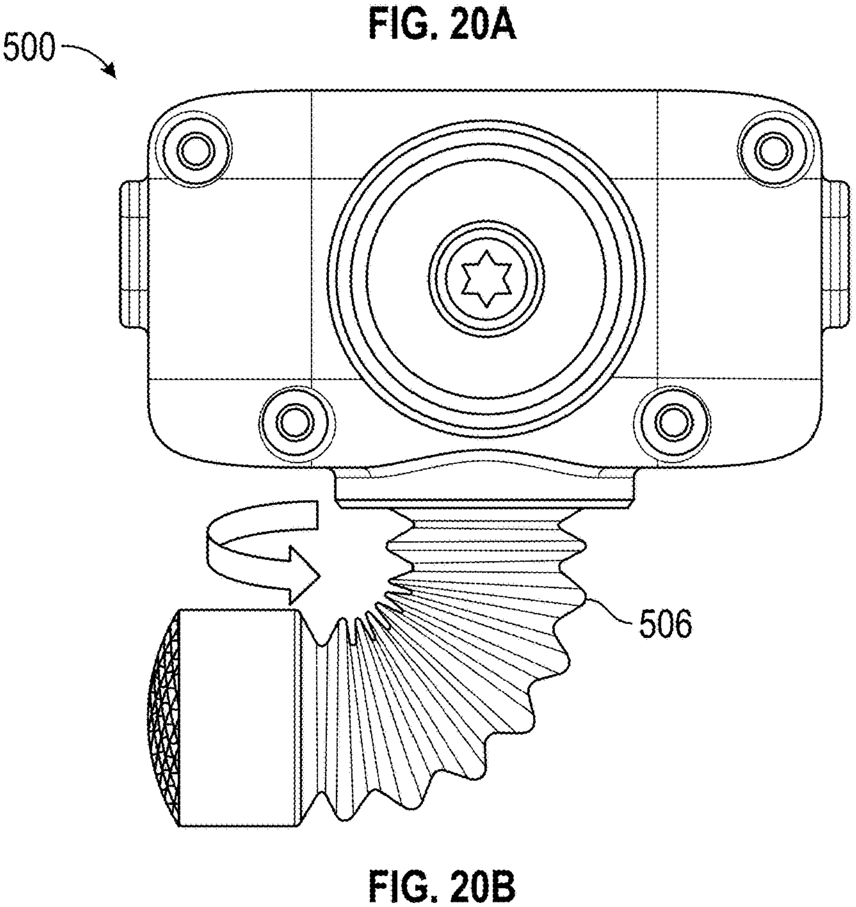
FIG. 20B illustrates a perspective view of the light of FIG. 20A, in a second position, according to an embodiment of the present disclosure.
Figure 20C:
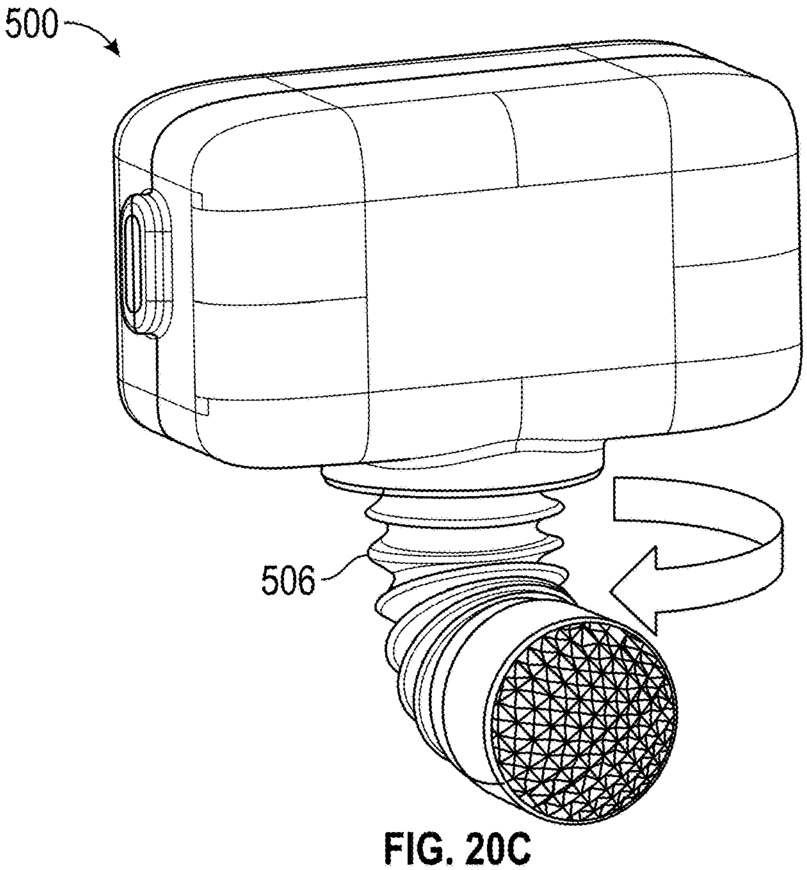
FIG. 20C illustrates a perspective view of the light of FIG. 20A, in a third position, according to an embodiment of the present disclosure.
Figure 20D:
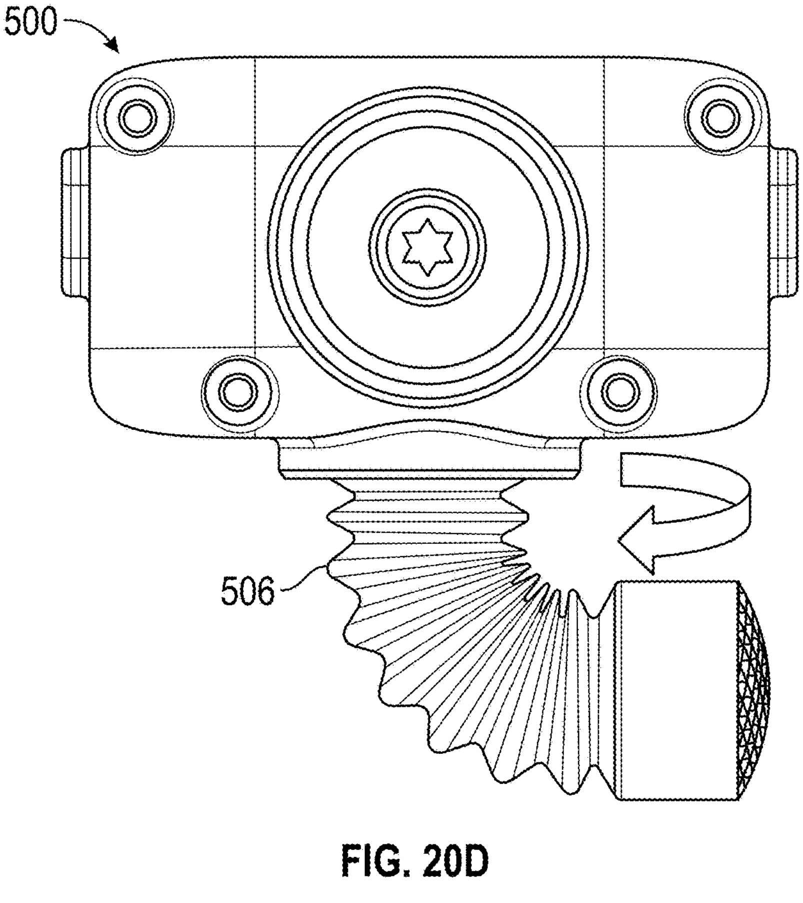
FIG. 20D illustrates a perspective view of the light of FIG. 20A, in a fourth position, according to an embodiment of the present disclosure.
Figure 20E:
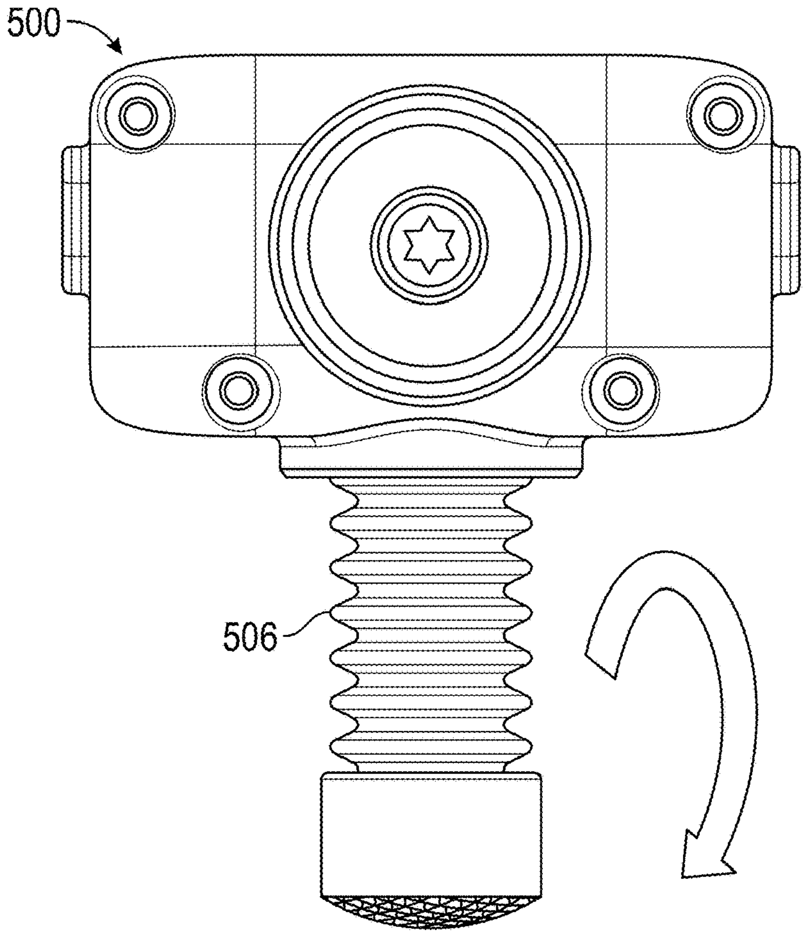
FIG. 20E illustrates a perspective view of the light of FIG. 20A, in a fifth position, according to an embodiment of the present disclosure.

For example, referring to FIG. 20A, the periscope 506 may rotate with respect to the base 502. FIG. 20B illustrates a position in which the periscope 506 is rotated 90 degrees to the left from the position in FIG. 20A. FIG. 20C illustrates a position in which the periscope 506 is rotated 90 degrees to the right from the position in FIG. 20A and 180 degrees from the position in FIG. 20B. FIG. 20D illustrates a position in which the periscope 506 is rotated 90 degrees from the position of FIG. 20B or 20B and 180 degrees from the position of FIG. 20A. FIG. 20E illustrates a position where the periscope is directed vertically downwards with respect to base 502, as viewed in the figure.

The rotational aspect of the periscope 506 with respect to base 502 may be employed to achieve any of the positions of FIGS. 20A to 20D. Furthermore, the periscope 506 may be a flexible body which allows for movement between the positions of FIGS. 20A to 20D and FIG. 20E. For example, the flexible body may be a corrugated pipe, a flexible metal, a flexible plastic, foam, or other constructions or materials which allow for flexing of the periscope 506 with no moving parts therein.

Figure 21:
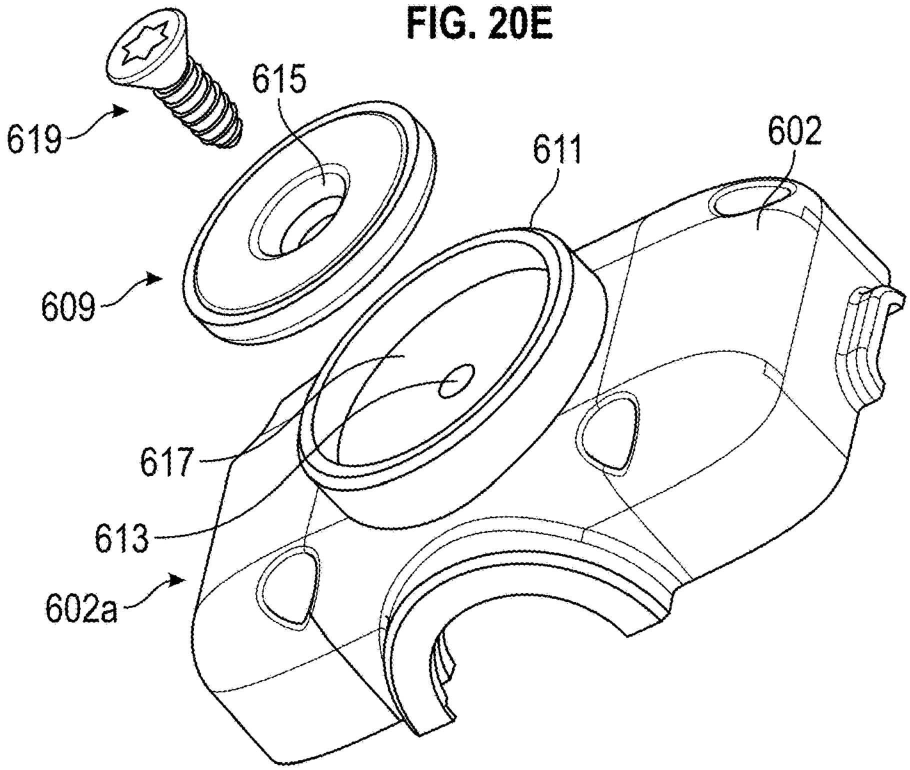
FIG. 21 illustrates a perspective, exploded view of a magnet for a light, according to an embodiment of the present disclosure.

FIG. 21 illustrates an alternative manner to couple a magnet to a base of a light. As shown in FIG. 21, a first base member 602*a* of a light base 602 includes a protrusion 611 that surrounds an interior space 617 in which a magnet 609 is located. An opening 613 may extend through the interior space 617. An opening 615 may extend through the magnet 609. Accordingly, a fastener 619 may extend through the opening 615 and the opening 613 to secure the magnet 609 to the first base member 602*a* of the base 602. Any of the lights described herein may include a magnet coupled to the base in the manner described with respect to FIG. 21 or in the manner described with respect to FIGS. 2A and 3, or any other known securing manner.

FIGS. 22A to 25C illustrate alternative assemblies to couple the base of the light to a structure. The assemblies described in FIGS. 22A to 25C may be employed on any of the aforementioned lights. The assemblies described may be used in lieu of the aforementioned magnet, or in addition to the magnet.

Figure 22A:
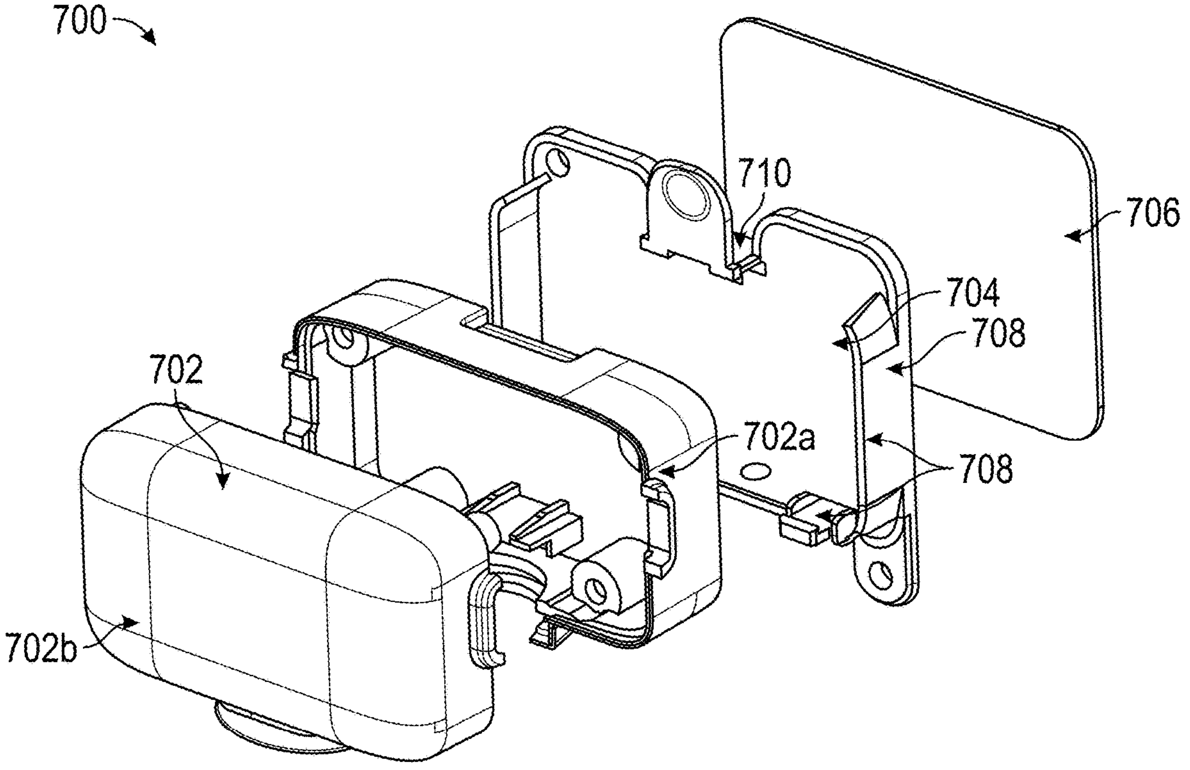
FIG. 22A illustrates a perspective, exploded view of a mounting assembly with a light base, according to an embodiment of the present disclosure.
Figure 22B:
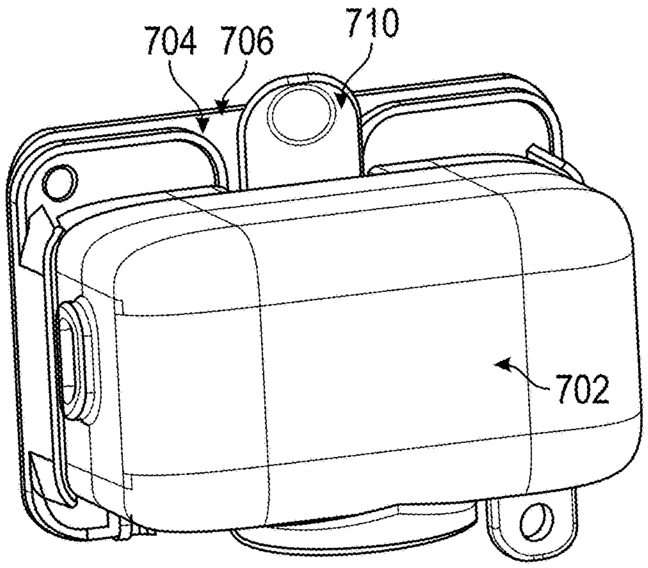
FIG. 22B illustrates a perspective view of the mounting assembly with the light base of FIG. 22A, according to an embodiment of the present disclosure.

FIGS. 22A and 22B illustrate a first exemplary mounting assembly 700. The mounting assembly 700 includes one side of tape (e.g., 3M® tape) that sticks on a plastic plate and another side of the tape sticks on the structure (e.g., a wall, soffit, gutter, etc.). The base of the light attaches to the plastic plate. The attachment allows for the light to be removably mounted.

Stated another way, and in more detail, the mounting assembly 700 includes double sided tape 706 and a plate 704. A base 702 of a light may be mounted to a surface with the mounting assembly 700. The base 702 may be for any of the lights described herein. The base 702 may include a first base member 702*a* and a second base member 702*b*. A plate 704 is provided to couple to the first base member 702*a*. The plate 704 may be a plastic plate. Double-sided tape 706 is provided for coupling to the plate 704. The plate 704 may include a plurality of protruding members 708. The protruding members 708 couple to an outer surface of the first base member 702*a* as shown in FIG. 22B. The protruding members 708 secure the base 702 to the plate 704. The plate 704 includes a release member 710. The release member 710 allows for the base 702 to be removed from the plate 704. Accordingly, the double sided tape 706 is coupled on one side to the plate 704. On the other side, the double sided tape 706 is coupled to structure surface (not shown, but, for example, a wall). Thus, the base 702 (and the light along therewith) may be removed from the structure surface without removing the mounting assembly 700. This allows for easy installation and removal of light strings by maintaining the mounting assembly installed, while allowing for the light to be removed or unclipped from the plate 704.

Figure 23A:
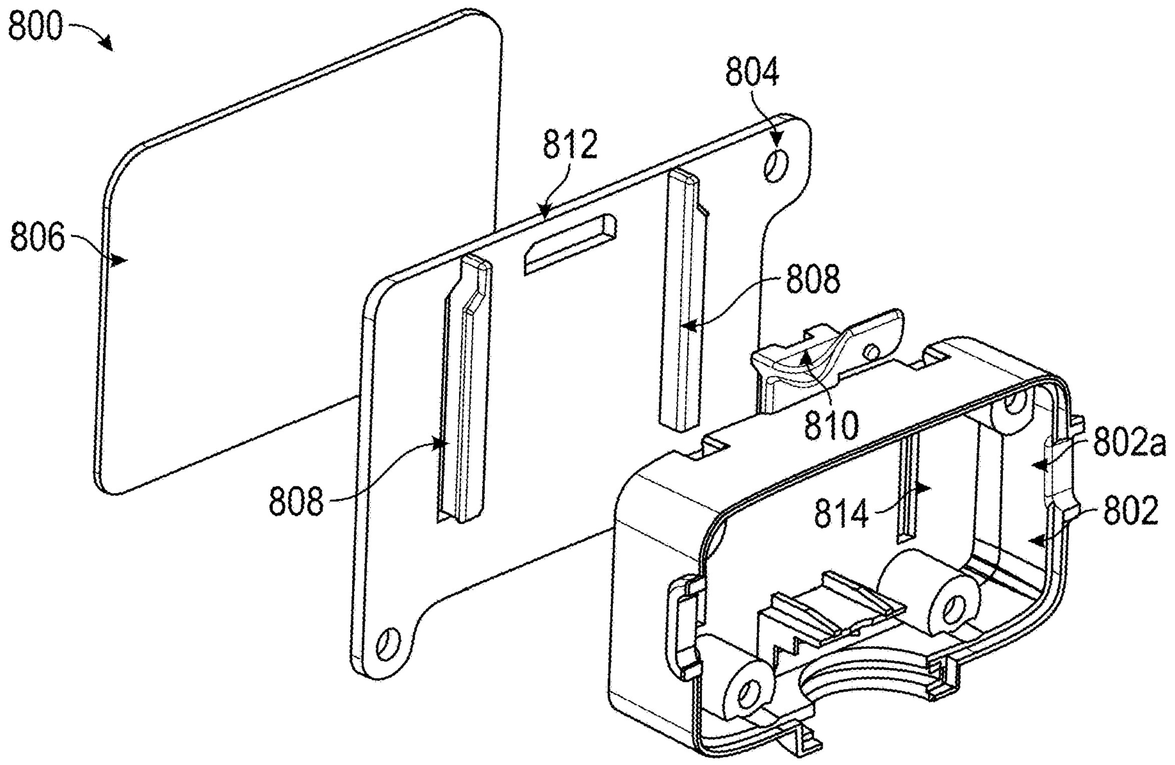
FIG. 23A illustrates a perspective, exploded view of a mounting assembly with a light base, according to an embodiment of the present disclosure.
Figure 23B:
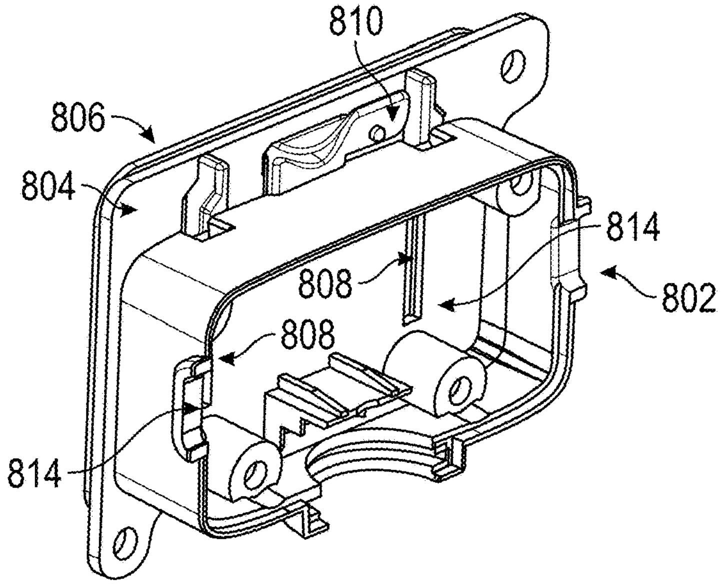
FIG. 23B illustrates a perspective view of the mounting assembly with the light base of FIG. 23A, according to an embodiment of the present disclosure.

FIGS. 23A and 23B illustrate another exemplary mounting assembly 800. The mounting assembly 800 includes a plate 804 and double sided tape 806. In the embodiment of FIGS. 23A and 23B, the light base 802 may slide onto protrusions 808 extending from the plate 804. Openings 814 in the base 802 receive the protrusions 808. Two openings

814 and protrusions 808 are shown, but more or fewer may be provided. The plate 804 may be a plastic plate. As with the previously described mounting assembly 700, the double sided tape 806 may have a first side coupled to the plate 804 and a second side coupled to the structure surface. A release member 810 may be provided on the first base member 802*a* of the light. Activating the release member 810 may disengage the first base member 802*a* from an opening 812 in the plate 804. This may unlock the base 802 from the plate 804 and allow for the first base member 802*a* to be slid off of the plate 804. This allow for easy installation and removal of the light strings by maintaining the mounting assembly installed, while allowing for the lights to be removed or slid off of the plate 804.

Figure 24A:
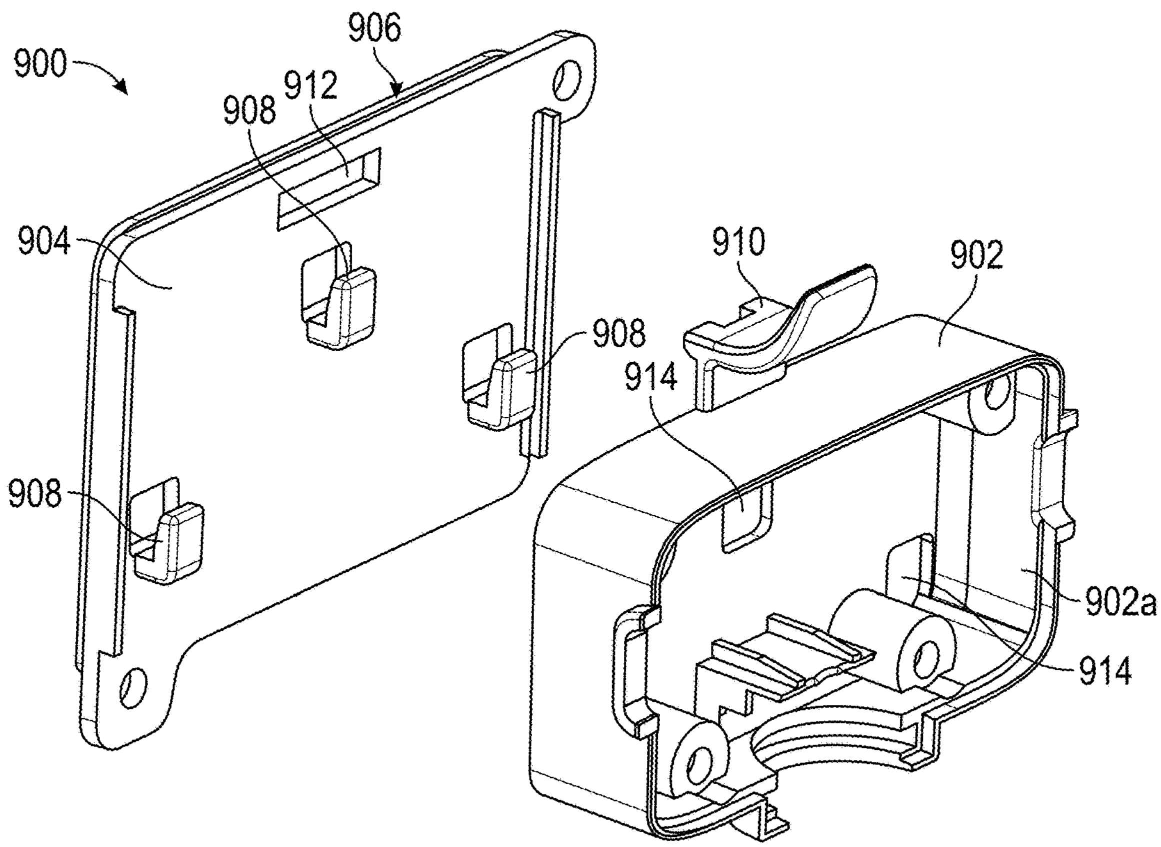
FIG. 24A illustrates a perspective, exploded view of a mounting assembly with a light base, according to an embodiment of the present disclosure.
Figure 24B:
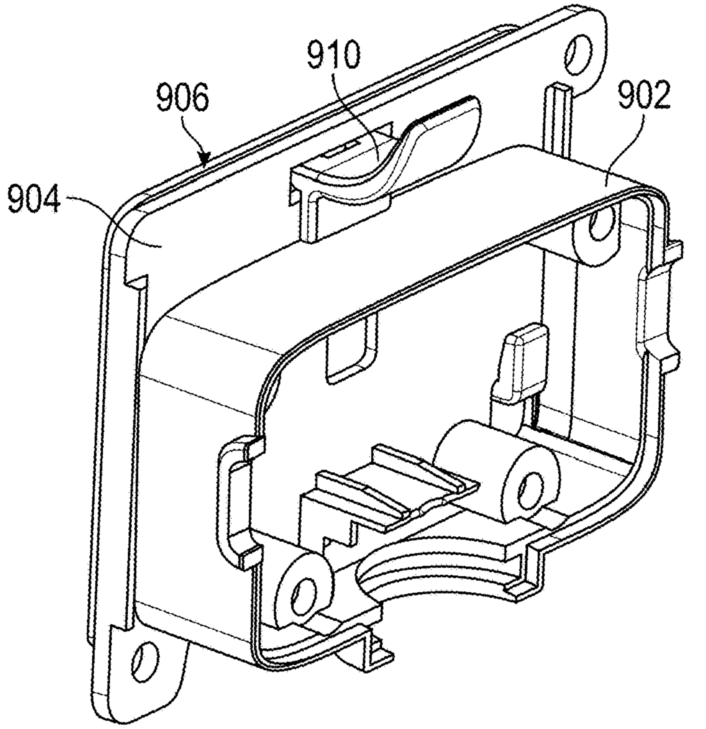
FIG. 24B illustrates a perspective view of the mounting assembly with the light base of FIG. 24A, according to an embodiment of the present disclosure.

FIGS. 24A and 24B illustrate another exemplary mounting assembly 900. The mounting assembly 900 includes a plate 904 and double sided tape 906. In the embodiment of FIGS. 24A and 24B, the light base 902 may slide onto protrusions 908 extending from the plate 904. Openings 914 in the base 902 receive the protrusions 908. Three openings 914 and protrusions 908 are shown, but more or fewer may be provided. The plate 904 may be a plastic plate. As with the previously described mounting assembly 700, the double sided tape 906 may have a first side coupled to the plate 904 and a second side coupled to the structure surface. A release member 910 may be provided on the first base member 902*a* of the light. Activating the release member 910 may disengage the first base member 902*a* from an opening 912 in the plate 904. This may unlock the base 902 from the plate 904 and allow for the first base member 902*a* to be removed from the plate 904. This allow for easy installation and removal of the light strings by maintaining the mounting assembly installed, while allowing for the lights to be removed from the plate 904.

Figure 25A:
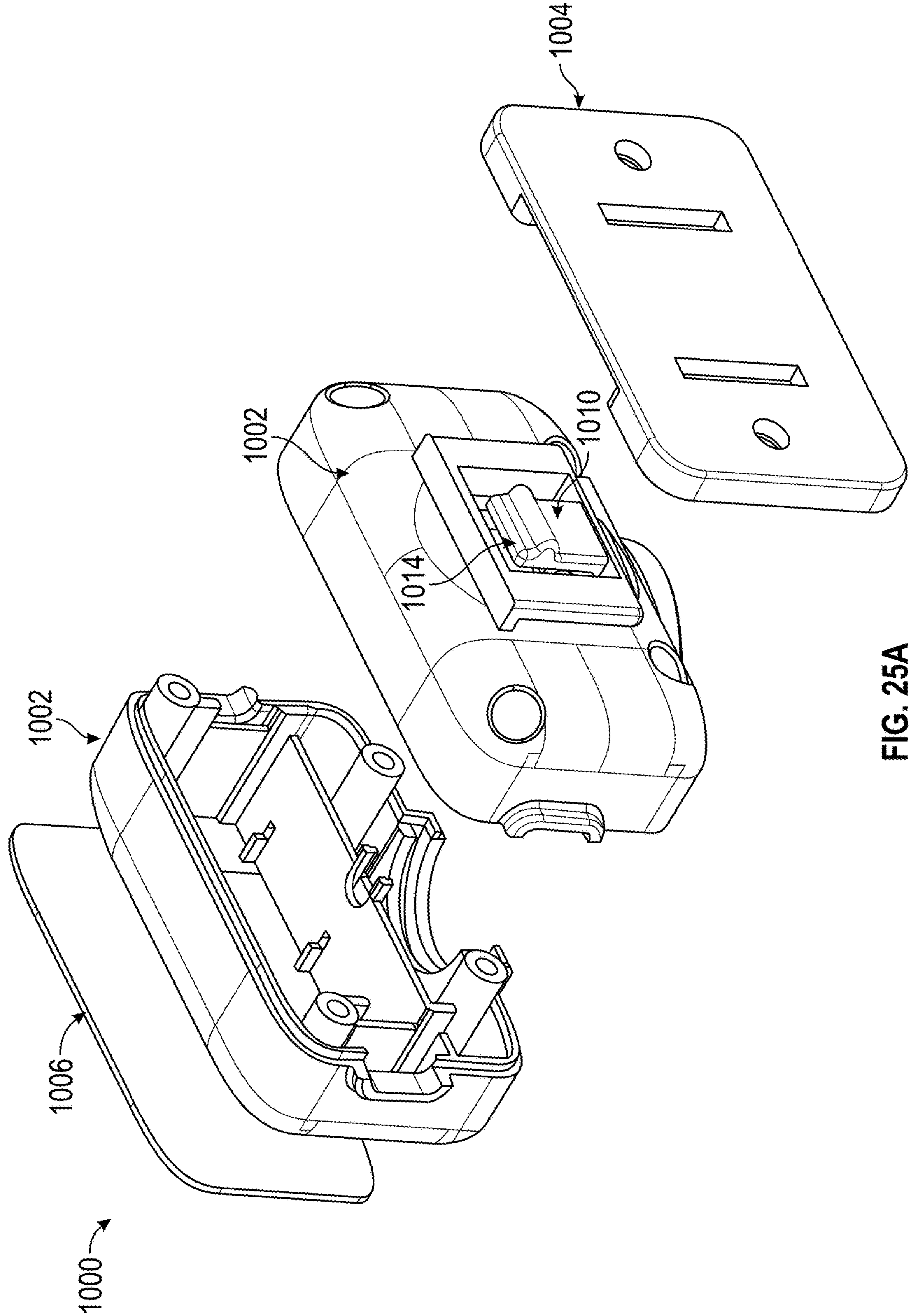
FIG. 25A illustrates a perspective, exploded view of a mounting assembly with a light base, according to an embodiment of the present disclosure.
Figure 25B:
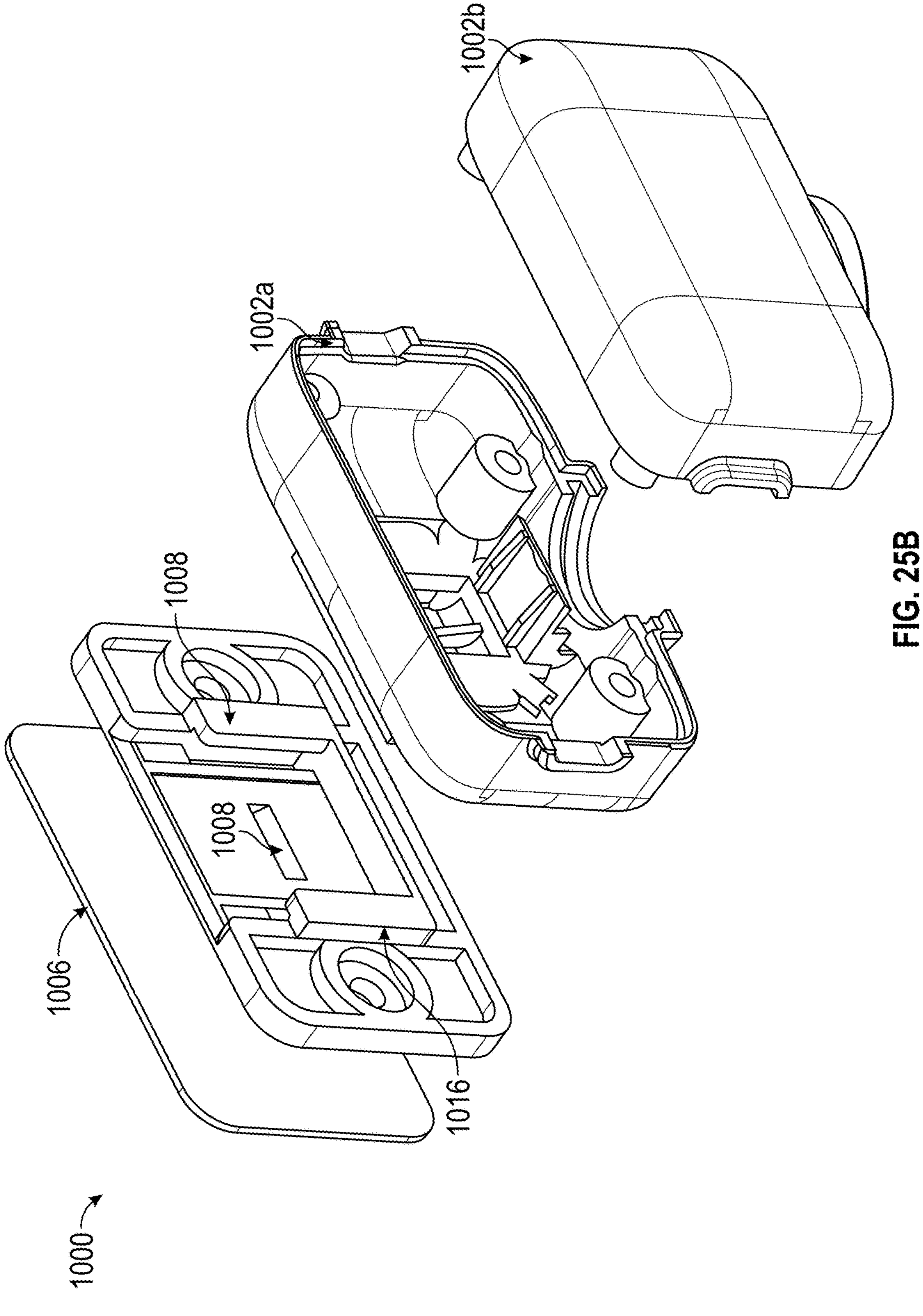
FIG. 25B illustrates another perspective, exploded view of the mounting assembly with the light base of FIG. 25A, according to an embodiment of the present disclosure.
Figure 25C:
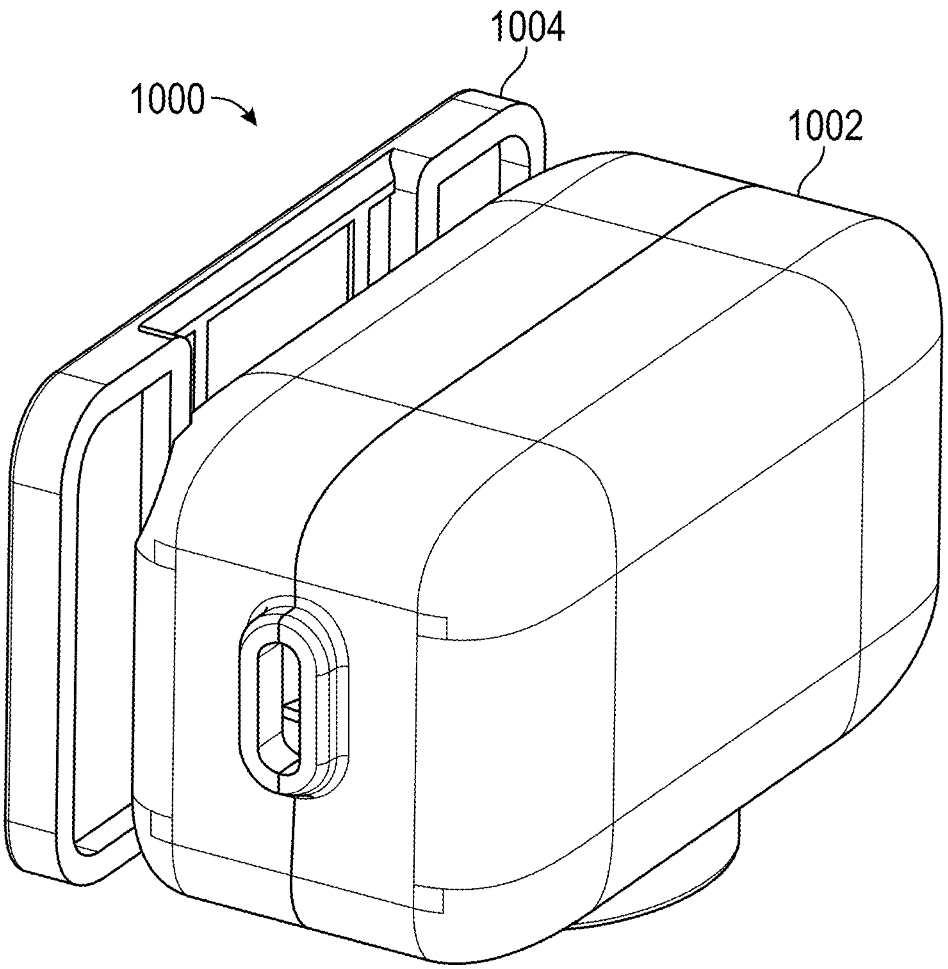
FIG. 25C illustrates a perspective view of the mounting assembly with the light base of FIG. 25A, according to an embodiment of the present disclosure.

FIGS. 25A to 25C illustrate another exemplary mounting assembly 1000. The mounting assembly 1000 includes a plate 1004 and double sided tape 1006. In the embodiment of FIGS. 25A to 25C, the light base 1002 may slide onto protrusions 1008 extending from the plate 1004. The light base 1002 has a first base member 1002*a* and a second base member 1002*b*. Clip 1014 in the first base member 1002*a* receives the protrusions 1008. Two protrusions 1008 are shown, but more or fewer may be provided. The plate 1004 may be a plastic plate. As with the previously described mounting assembly 700, the double sided tape 1006 may have a first side coupled to the plate 1004 and a second side coupled to the structure surface. A release member 1010 may be provided on the first base member 1002*a* of the light. Activating the release member 1010 may disengage the first base member 1002*a* from a buckle 1016 on the plate 1004. This may unlock the base 1002 from the plate 1004 and allow for the first base member 1002*a* to be removed from the plate 1004. This allow for easy installation and removal of the light strings by maintaining the mounting assembly installed, while allowing for the lights to be removed from the plate 1004.

Figure 26A:
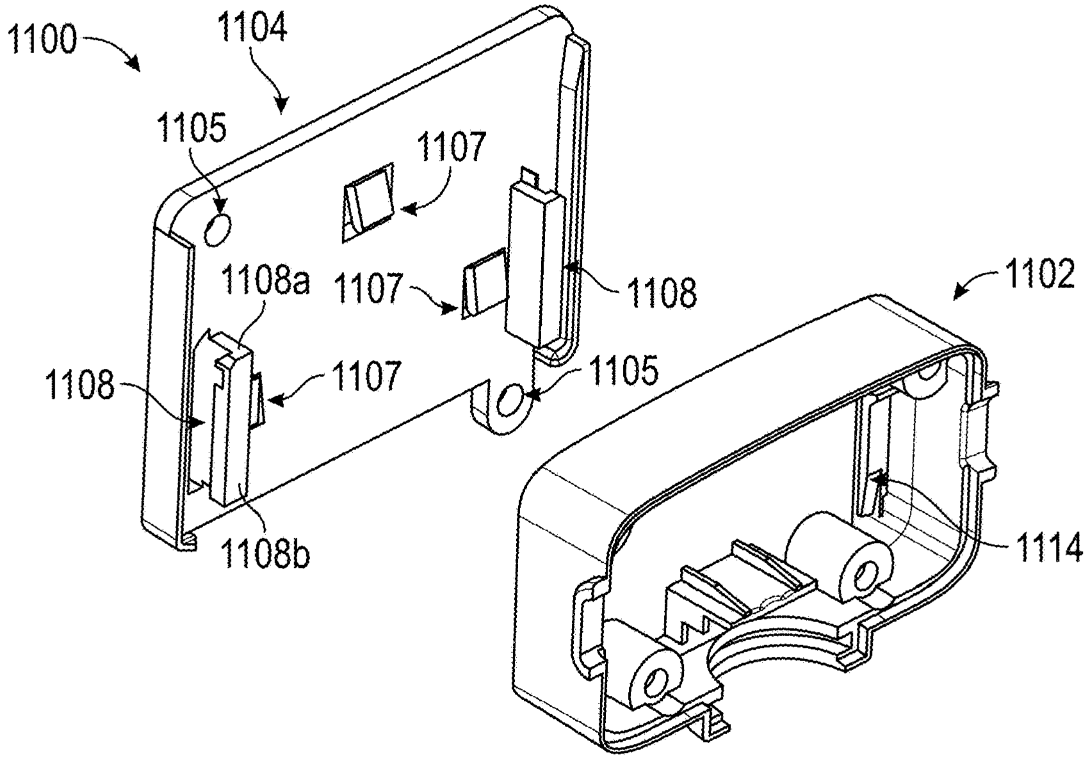
FIG. 26A illustrates a perspective, exploded view of a mounting assembly with a light base, according to an embodiment of the present disclosure.
Figure 26B:
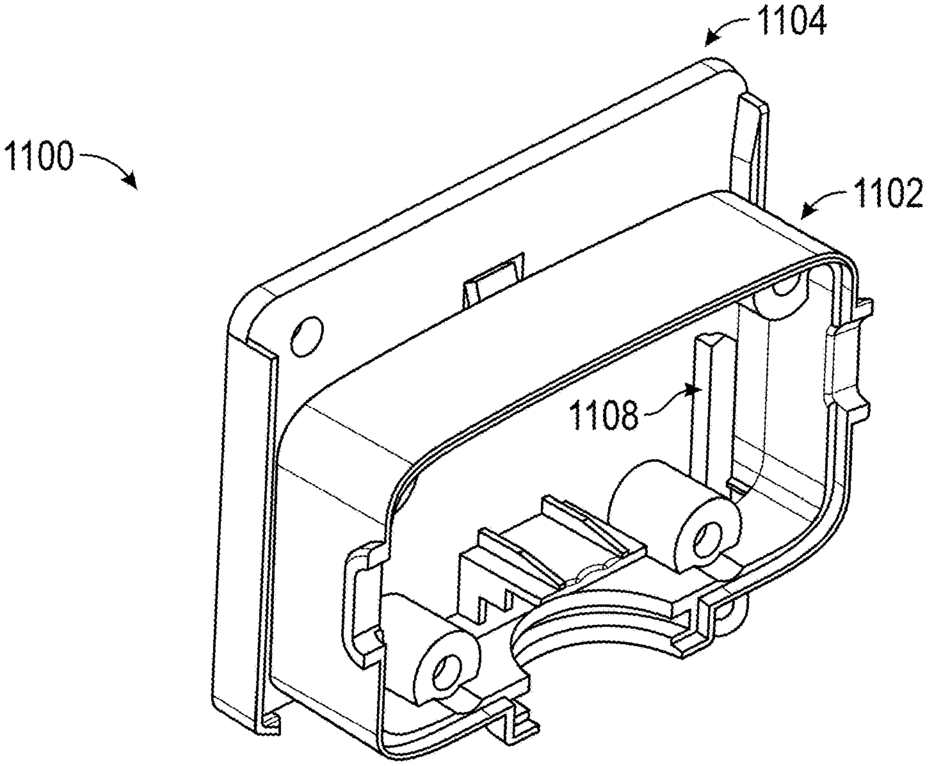
FIG. 26B illustrates a perspective view of the mounting assembly with the light base of FIG. 26A, according to an embodiment of the present disclosure.

FIGS. 26A and 26B illustrate another exemplary mounting assembly 1100. The mounting assembly 1100 includes a plate 1104. The mounting assembly 1100 may include double sided tape as described in previously embodiments. Additionally, or alternatively, the plate 1104 may include one or more openings 1105 for receiving fasteners. The fasteners may secure the plate 1104 to the structure surface.

In the embodiment of FIGS. 26A and 26B, the light base 1102 may attach to protrusions 1108 extending from the plate 1104. The protrusions may be generally L-shaped protrusions with a first portion 1108*a* extending away from the plate 1104 and a second portion 1108*b* extending perpendicular to the first portion 1108*a*. Openings 1114 in the base 1102 receive the protrusions 1108. Two openings 1114 (one opening 1114 is obscured due to the angle of FIG. 26A, however the appearance is the same as the opening 1114 shown) and protrusions 1108 are described, but more or fewer may be provided. The plate 1104 may be a plastic plate. As with the previously described mounting assembly 700, the double sided tape may have a first side coupled to the plate 1104 and a second side coupled to the structure surface. In some examples, in addition to the double side tape, or in lieu of the double sided tape, fasteners secure the plate 1104 to a surface. Three blocks 1107 are provided on the plate 1104. The blocks 1107 interact with the light to secure the light tightly to the plate 1104 when a user slides the light onto the plate 1104. Although three blocks 1107 are shown, more or fewer may be provided. The base 1102 may be releasably coupled to the plate 1104 with the protrusion 1108 and opening 1114 interaction. This allows for easy installation and removal of the light strings by maintaining the mounting assembly installed, while allowing for the lights to be removed from the plate 1104.

Figure 27A:
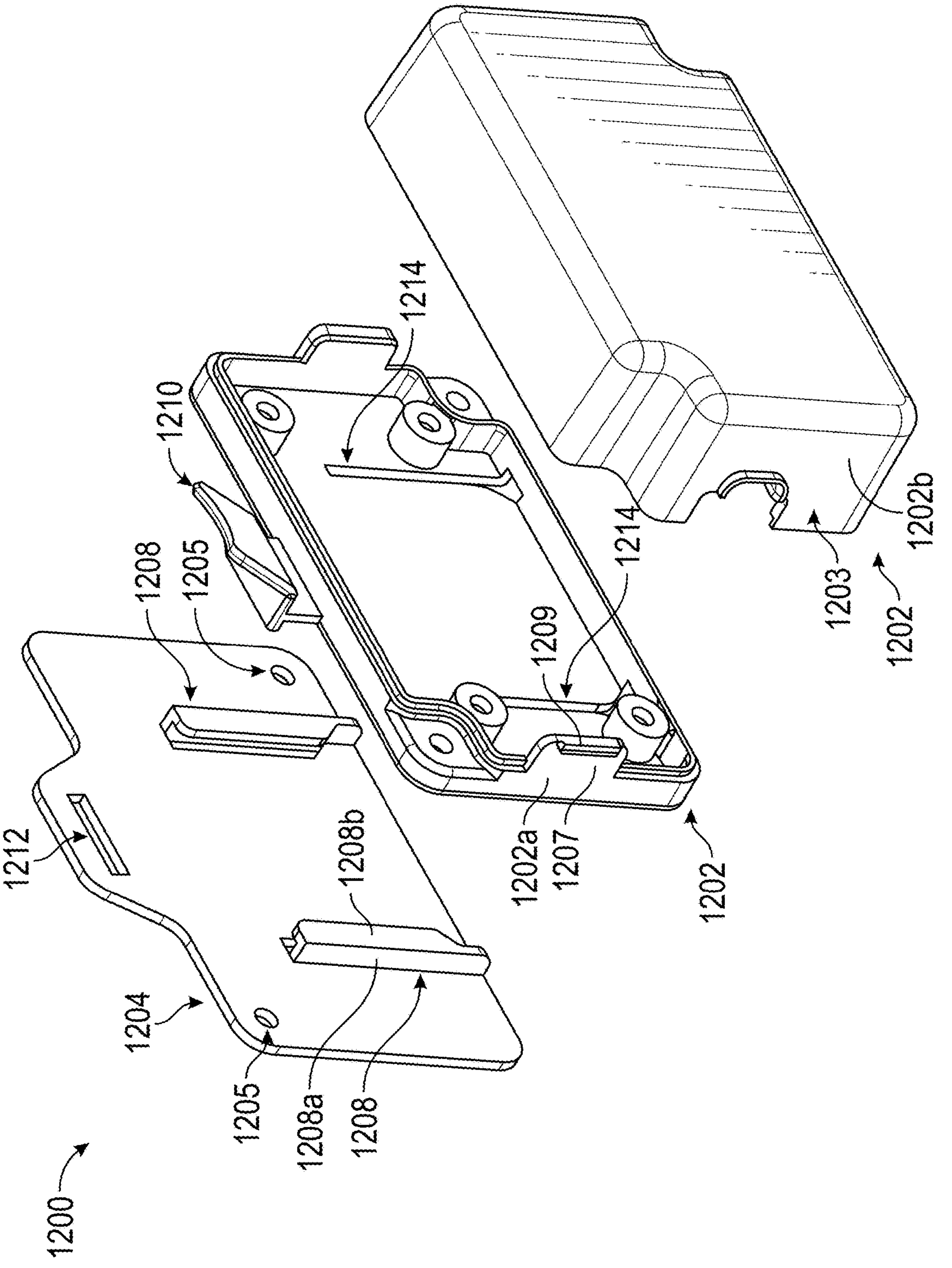
FIG. 27A illustrates a perspective, exploded view of a mounting assembly with a light base, according to an embodiment of the present disclosure.
Figure 27B:
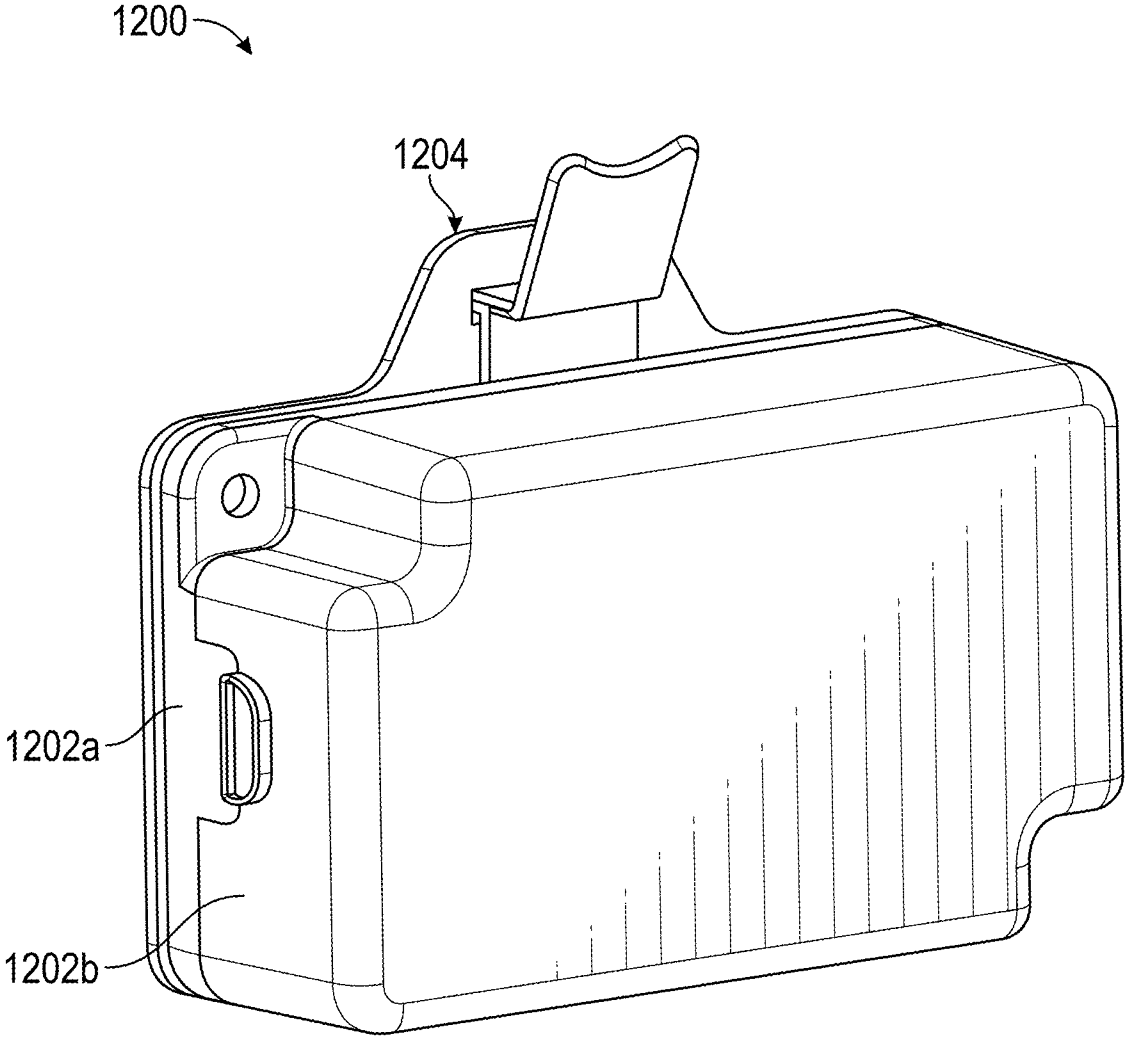
FIG. 27B illustrates a perspective view of the mounting assembly with the light base of FIG. 27A, according to an embodiment of the present disclosure.

FIGS. 27A and 27B illustrate another exemplary mounting assembly 1200. The mounting assembly 1200 includes a plate 1204. The mounting assembly 1200 may include double sided tape as described in previously embodiments. Additionally, or alternatively, the plate 1204 may include one or more openings 1205 for receiving fasteners. The fasteners may secure the plate 1204 to the structure surface.

In the embodiment of FIGS. 27A and 27B, the light base 1202 may attach to protrusions 1208 extending from the plate 1204. The protrusions may be generally L-shaped protrusions with a first portion 1208*a* extending away from the plate 1204 and a second portion 1208*b* extending perpendicular to the first portion 1208*a*. Openings 1214 in a first base member 1202*a* of the base 1202 receive the protrusions 1208. Two openings 1214 and protrusions 1208 are described, but more or fewer may be provided. The plate 1204 may be a plastic plate. As with the previously described mounting assembly 700, the double sided tape may have a first side coupled to the plate 1204 and a second side coupled to the structure surface. In some examples, in addition to the double side tape, or in lieu of the double sided tape, fasteners secure the plate 1204 to a surface. The second base member 1202*b* of the base 1202 may include a recessed portion 1203 for receiving a protrusion 1207 having a latch 1209 thereon. The latch 1209 may secure the second base member 1202*b* to the first base member 1202*a*.

A release member 1210 may be provided on the first base member 1202*a* of the light. Activating the release member 1210 may disengage the first base member 1202*a* and the second base member 1202*b* from an opening 1212 in the plate 1204. This may unlock the base 1202 from the plate 1204 and allow for the first base member 1202*a* to be removed from the plate 1204. This allow for easy installation and removal of the light strings by maintaining the mounting assembly installed, while allowing for the lights to be removed from the plate 1204.

Figure 28A:
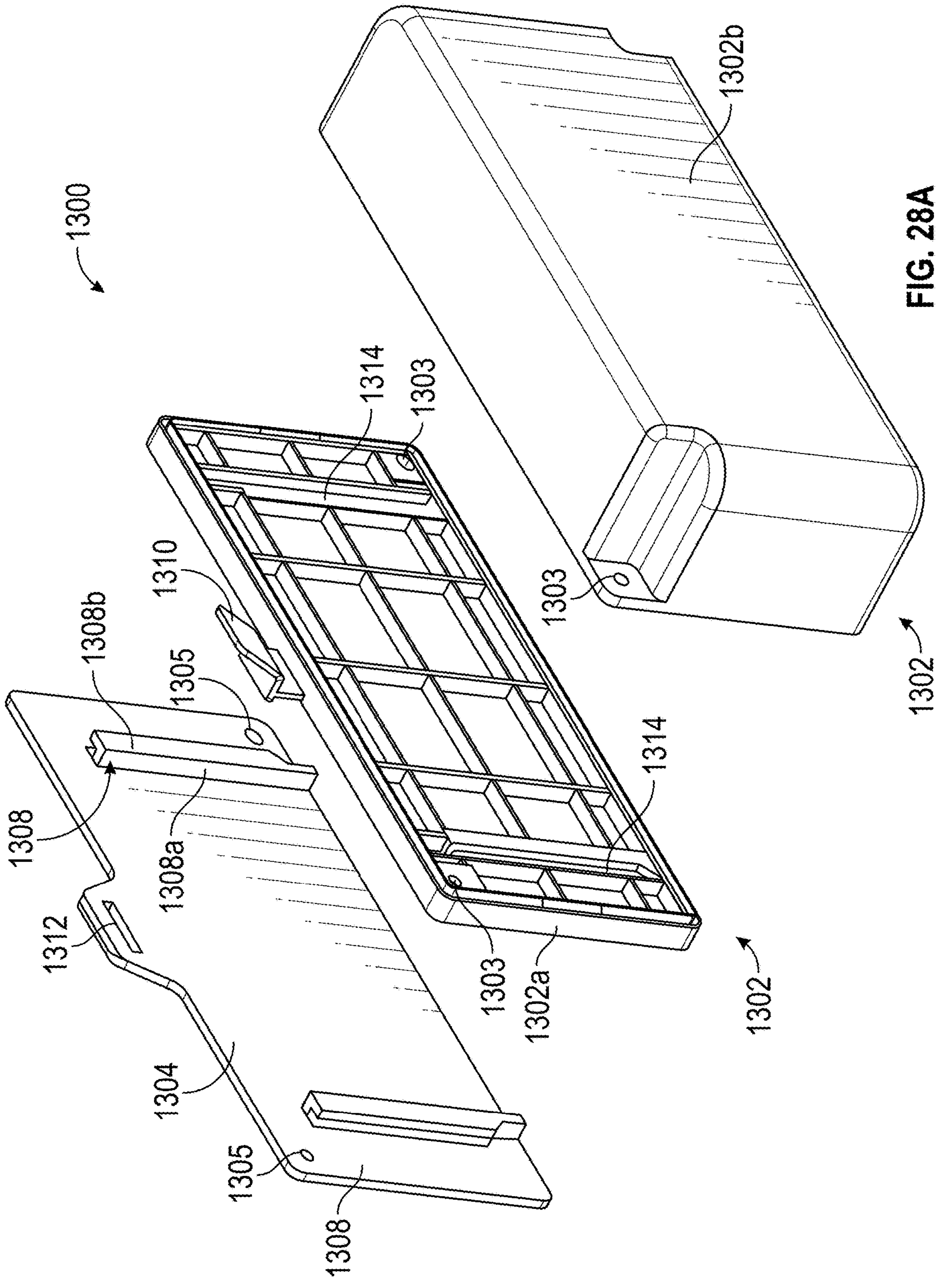
FIG. 28A illustrates a perspective, exploded view of a mounting assembly with a light base, according to an embodiment of the present disclosure.
Figure 28B:
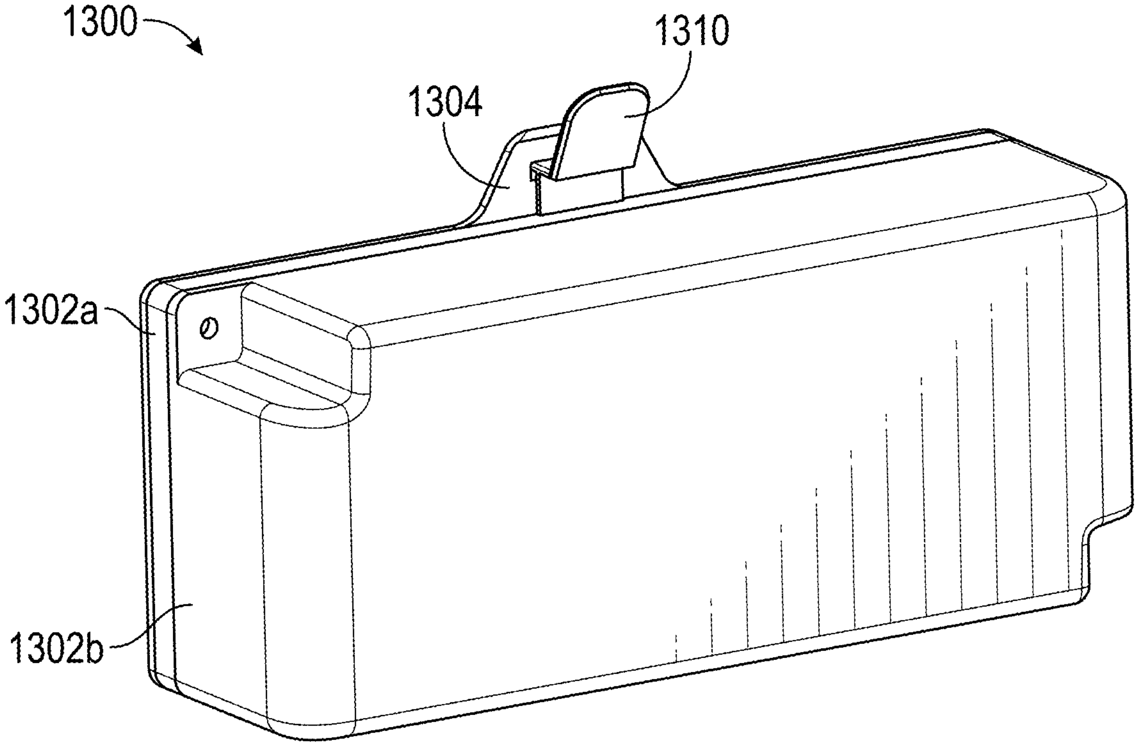
FIG. 28B illustrates a perspective view of the mounting assembly with the light base of FIG. 24A, according to an embodiment of the present disclosure.

FIGS. 28A and 28B illustrate another exemplary mounting assembly 1300. The mounting assembly 1300 includes a plate 1304. The mounting assembly 1300 may include double sided tape as described in previously embodiments. Additionally, or alternatively, the plate 1304 may include one or more openings 1305 for receiving fasteners. The fasteners may secure the plate 1304 to the structure surface.

In the embodiment of FIGS. 28A and 28B, the light base 1302 may attach to protrusions 1308 extending from the plate 1304. The protrusions may be generally L-shaped protrusions with a first portion 1308*a* extending away from the plate 1304 and a second portion 1208*b* extending perpendicular to the first portion 1308*a*. Openings 1314 in a first base member 1302*a* of the base 1302 receive the protrusions 1308. Two openings 1314 and protrusions 1308 are described, but more or fewer may be provided. The plate 1304 may be a plastic plate. As with the previously described mounting assembly 700, the double sided tape may have a first side coupled to the plate 1304 and a second side coupled to the structure surface. In some examples, in addition to the double side tape, or in lieu of the double sided tape, fasteners secure the plate 1304 to a surface. Each of the first base member 1302*a* and the second base member 1302*b* may include openings 1303 that align with each other, fasteners may extend therethrough to couple the first base member 1302*a* to the second base member 1304*b*.

A release member 1310 may be provided on the first base member 1302*a* of the light. Activating the release member 1310 may disengage the first base member 1302*a* and the second base member 1302*b* from an opening 1312 in the plate 1304. This may unlock the base 1302 from the plate 1304 and allow for the first base member 1302*a* to be removed from the plate 1304. This allow for easy installation and removal of the light strings by maintaining the mounting assembly installed, while allowing for the lights to be removed from the plate 1304.

Any of the aforementioned mounting assemblies may be employed with any of the aforementioned lights. This means that the bases of the lights described in FIGS. 1 to 21 may be interchanged with or combined with the bases of any of the mounting assemblies of FIGS. 22A to 28B.

The aforementioned exemplary lights may be combined and/or features thereof may be combined. For example, any of the aforementioned lights may be combined or altered such that the light may hinge at the periscope, may rotate with respect to the base, or may both hinge at the periscope and rotate with respect to the base. Furthermore, lights within a single light string may have different capabilities for bending and rotation. Furthermore, light strings having different capabilities or the same capabilities may be coupled together to form longer light strings. Although shown with 180 degree rotation between two positions, intermediate positions are also contemplated in any of the aforementioned embodiments. Although shown and described with hinging of the periscope between three positions, additional positions are contemplated.

FIGS. 29 to 33 illustrate a lighting system 1400. The light system 1400 includes a first light string 1410 formed of the light 200 and a second light string 1420 formed of the light 100. Although a single light 200 and a single light 100 are shown, more may be provided (e.g., a plurality of lights on a string, such as shown in FIG. 1). The light system 1400 may include a connector 1430. The connector may include a first opening 1432 for the power cable 1412 of the first light string 1410 and a second opening 1434 for the power cable 1422 of the second light string 1420. The power cable 1412 and the power cable 1422 may be electrically coupled within the connector 1430. Each of the power cable 1412 and the power cable 1422 may be a three core wire. The connector 1430 may allow for the connection of two or more light strings together. In this manner, a light string of any length may be provided. Although shown as connecting a light string of lights 100 and a light string of lights 200 together, the connector 1430 may connect light strings with the same lights together (e.g., two light strings with lights 100) or may connect light strings in accordance with the present disclosure having different lenses than shown. The connector 1430 may be arranged such that each of the power cables 1412 and 1422 may be cut to a custom length and electrically connected within the connector 1430. This allows for user customization of the light string, while still maintaining electrical power to the lights. In some examples, an extra power supply may be provided to additional power to the light string. This may be necessary, for example, where many lights are coupled together (e.g., more than 128 lights).

Figure 34:
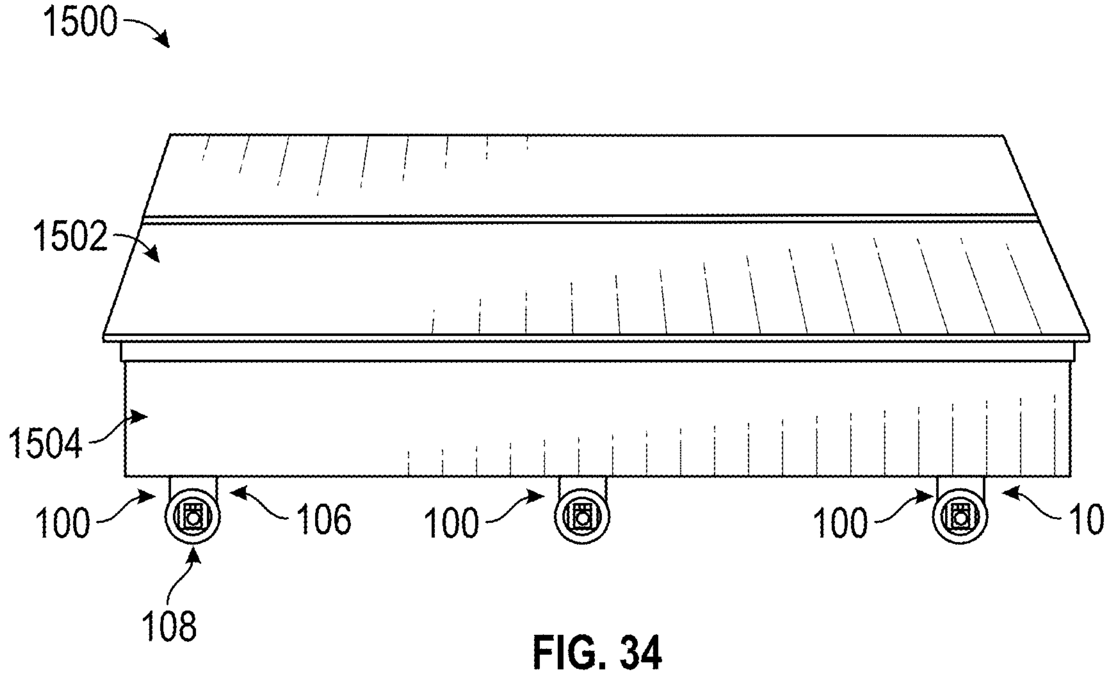
FIG. 34 illustrates a light string installed on a house, according to an embodiment of the present disclosure.
Figure 35:
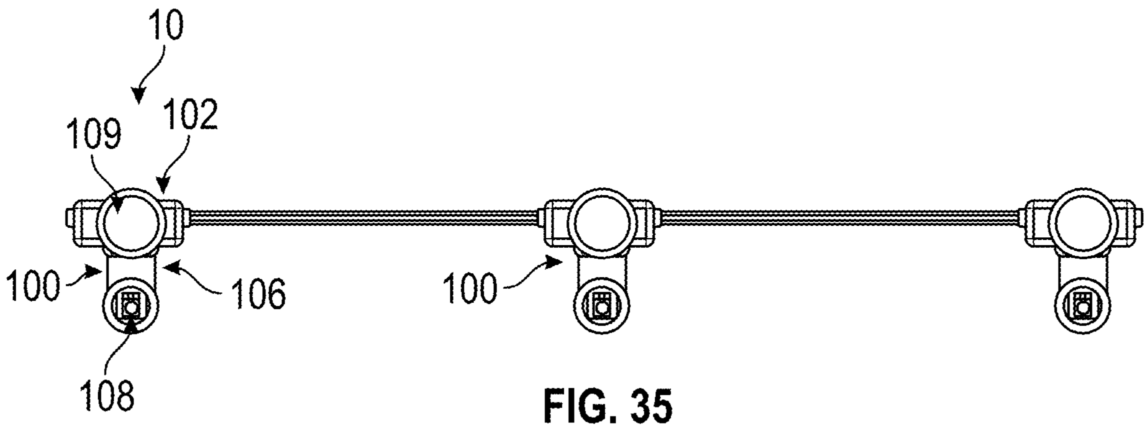
FIG. 35 illustrates a view of the light string of FIG. 34, according to an embodiment of the present disclosure.
Figure 36:
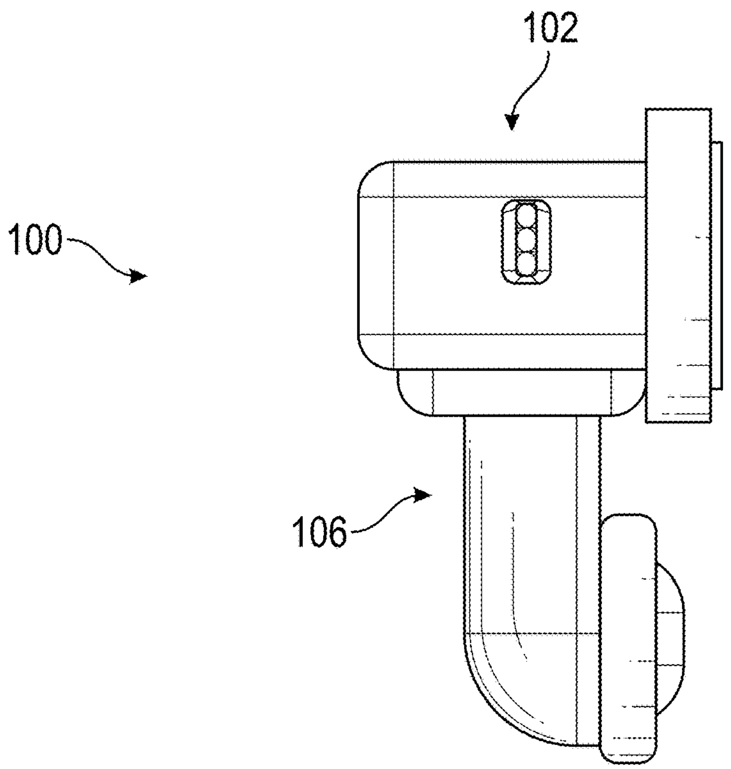
FIG. 36 illustrates a view of the light string of FIG. 34, according to an embodiment of the present disclosure.
Figure 37:
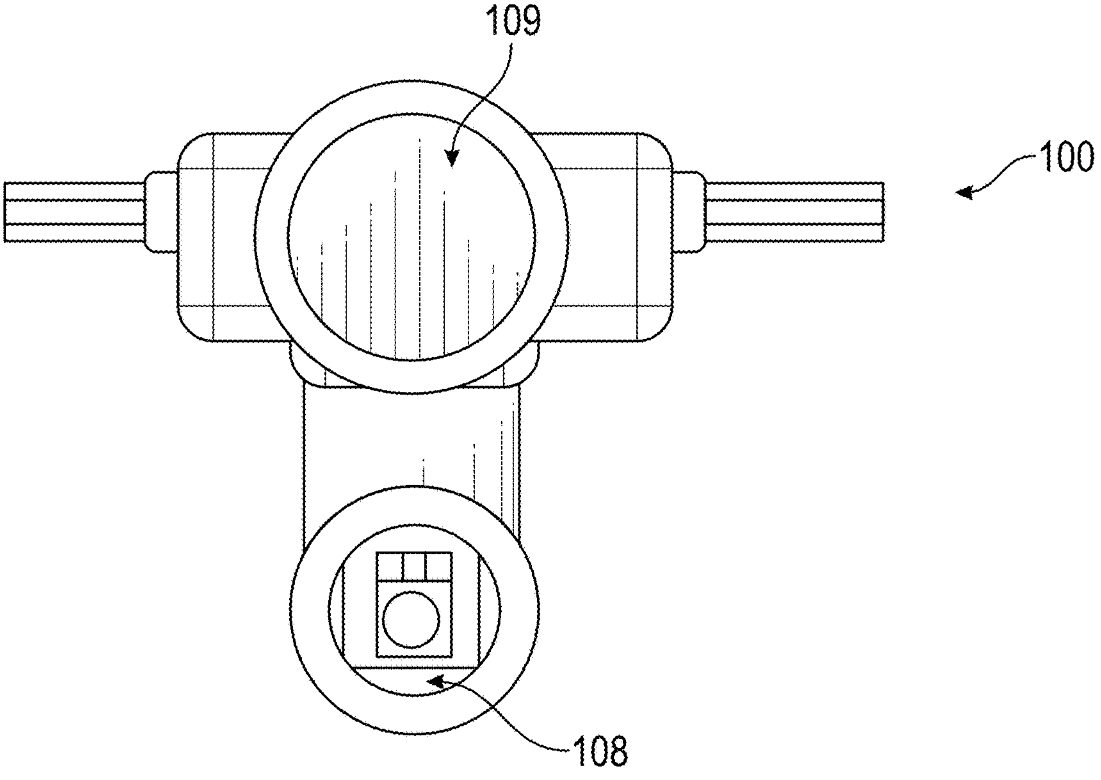
FIG. 37 illustrates a view of the light string of FIG. 34, according to an embodiment of the present disclosure.
Figure 38:
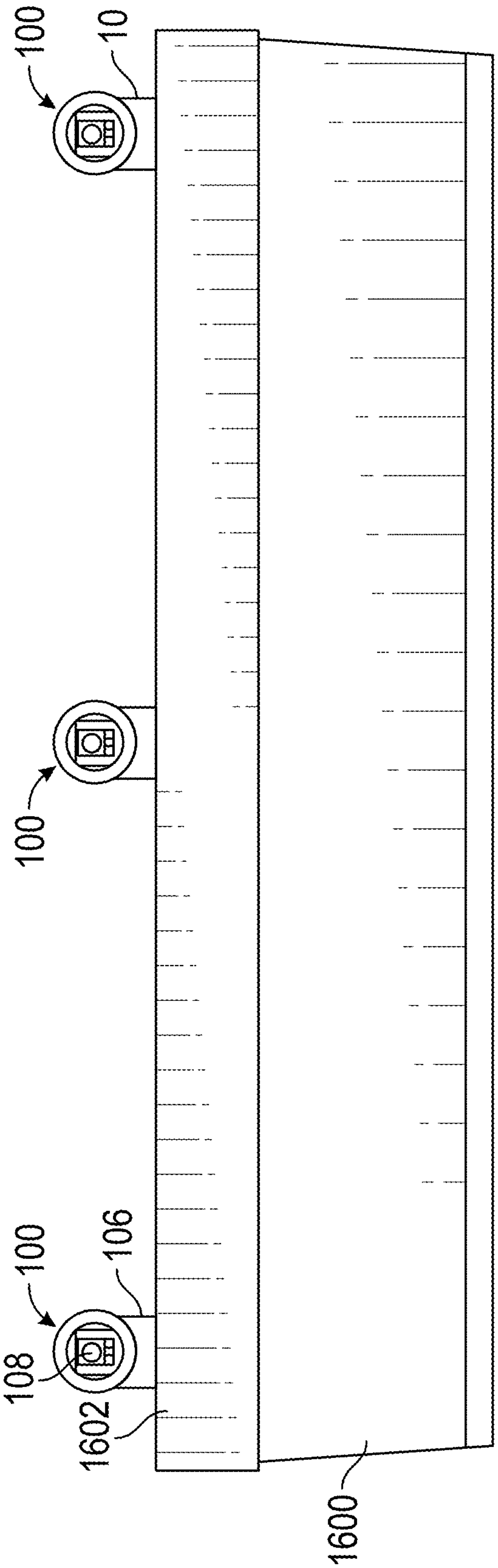
FIG. 38 illustrates a light string installed on a house, according to an embodiment of the present disclosure.
Figure 39:
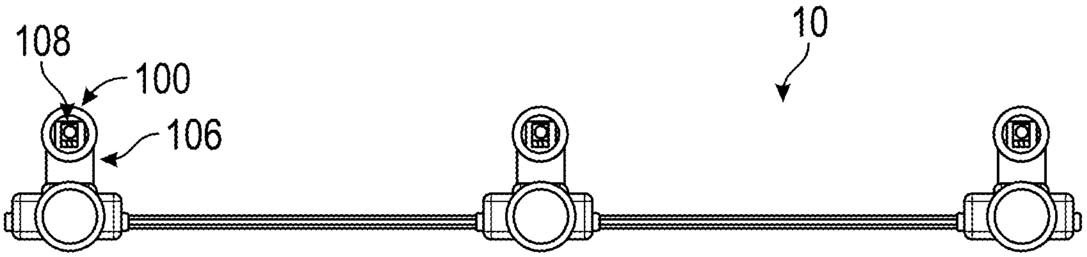
FIG. 39 illustrates a view of the light string of FIG. 38, according to an embodiment of the present disclosure.
Figure 40:
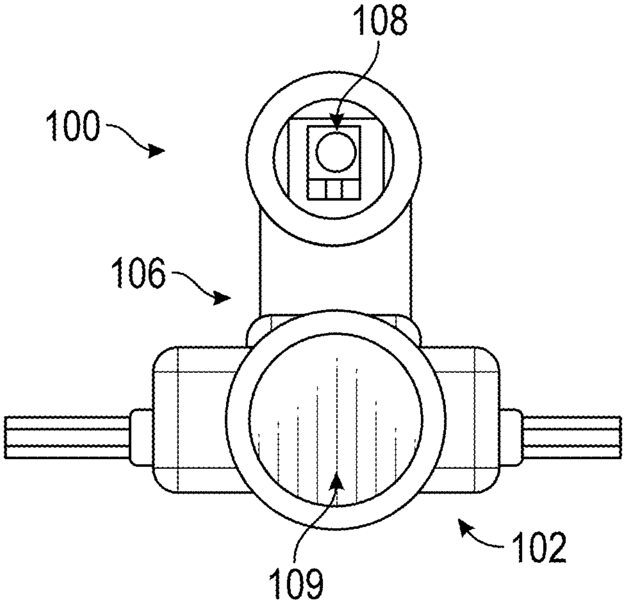
FIG. 40 illustrates a view of the light string of FIG. 38, according to an embodiment of the present disclosure.
Figure 41:
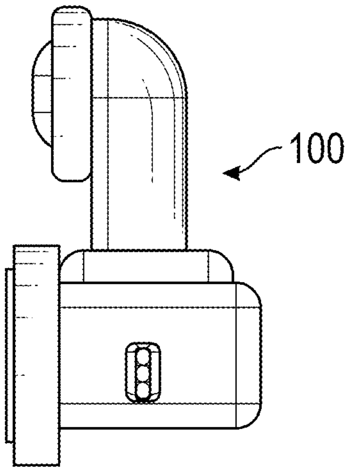
FIG. 41 illustrates a view of the light string of FIG. 38, according to an embodiment of the present disclosure.

FIGS. 34 to 37 illustrate an exemplary application of the light string of the present disclosure. Although shown employing lights 100, the lights 200, or other lights (e.g., lights 300 or lights 400 or lights 500) in accordance with the principles of the present disclosure, may be employed in the application shown and described with respect to FIGS. 34 to 37. In the example of FIGS. 31 to 34, the light string 10 may be installed on a house 1500. A portion of a roof 1502 and a portion of a soffit 1504 of the house 1500 are shown in FIG. 34. The light string 10 may be installed on a rear side (not visible) of the soffit 1504. The magnet 109 of the light string 10 may be installed directly to the rear side of the soffit 1504 if the soffit 1504 is formed of a magnetic material. Alternatively, a magnetic metal plate, such as metal plate 138 of FIG. 7, may be installed on the rear side of the soffit. The magnet 109 may then be installed on the metal plate 138, as previously described. If metal plates 138 are employed, each light 100 of the light string 10 may be mounted to an individual metal plate 138. Alternatively, or additionally, any of the mounting assemblies described with respect to FIGS. 22A to 28B may be employed. The orientation of the light string 10 in FIGS. 34 to 37, may be "upside down" in the sense that the periscope 106 and the lens 108 hang vertically downward from the base 102. That is, the periscope 106 extends between the base 102 and the ground surface. As shown in FIG. 35, each light 100 of the light string 10 may be spaced apart a predetermined distance. In one example, the predetermined distance is 6 inches, though other distances are contemplated.

Figure 29:
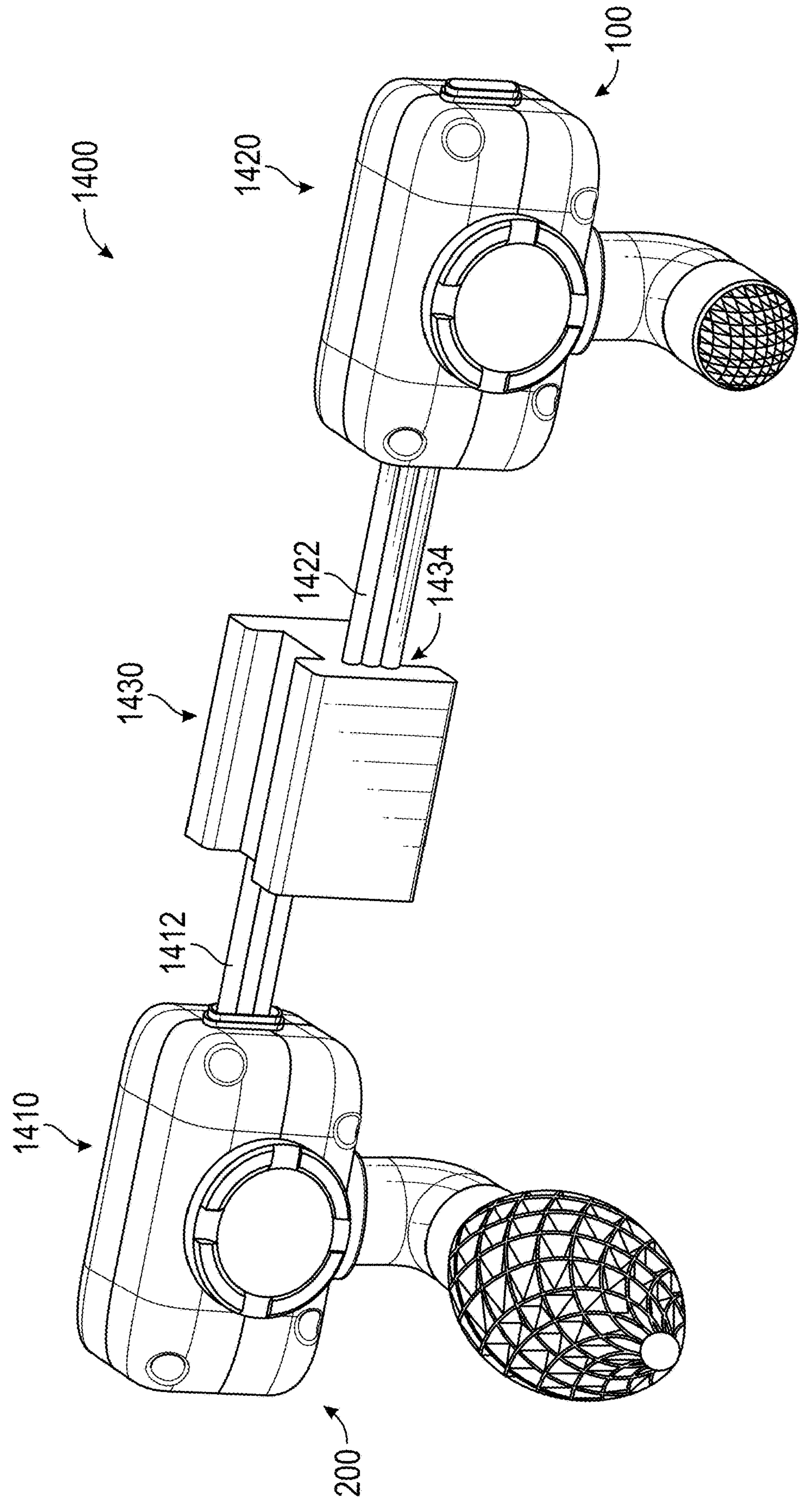
FIG. 29 illustrates a perspective view of a lighting system, according to an embodiment of the present disclosure.
Figure 30:
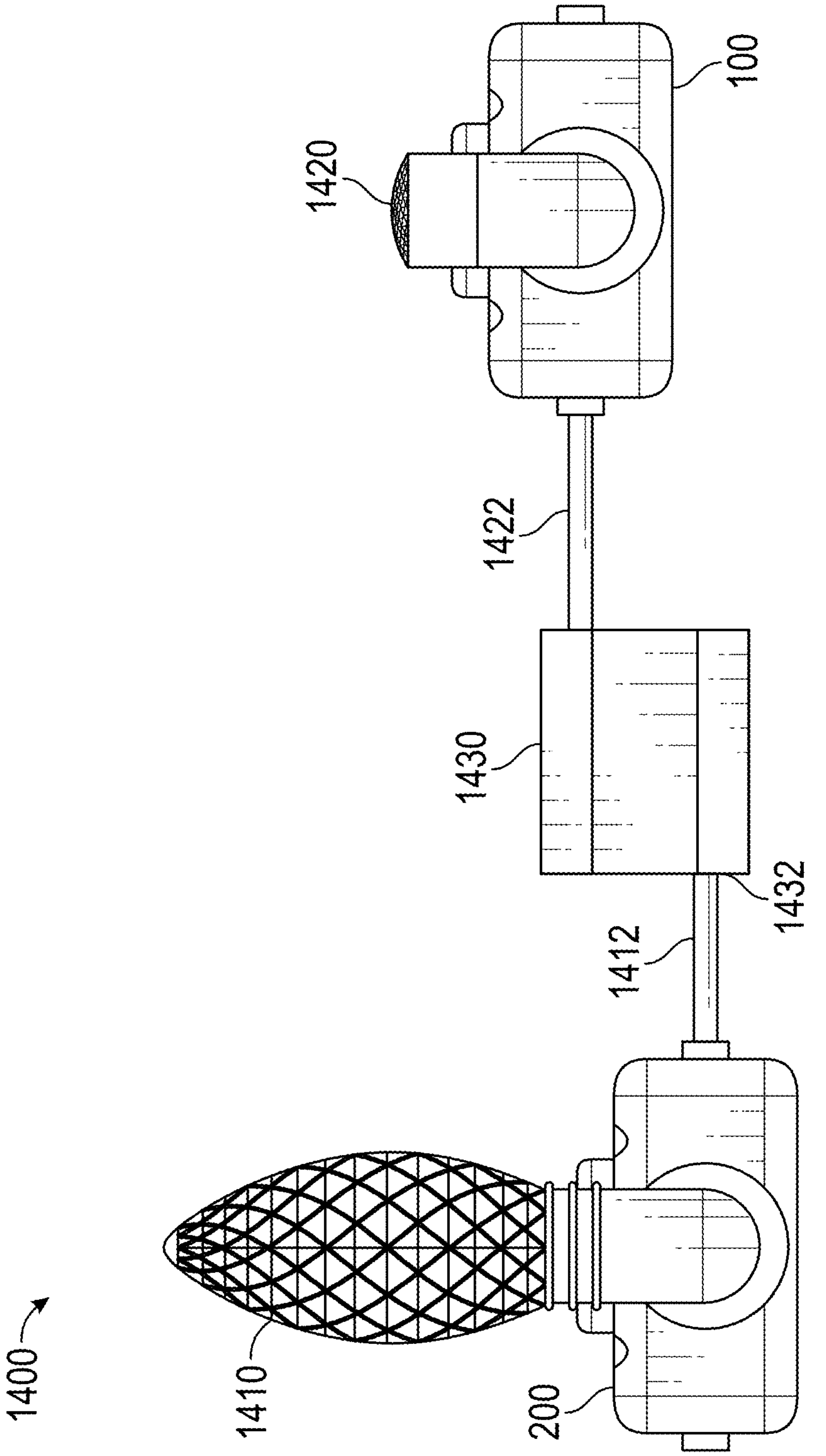
FIG. 30 illustrates another view of the lighting system of FIG. 29, according to an embodiment of the present disclosure.
Figure 31:
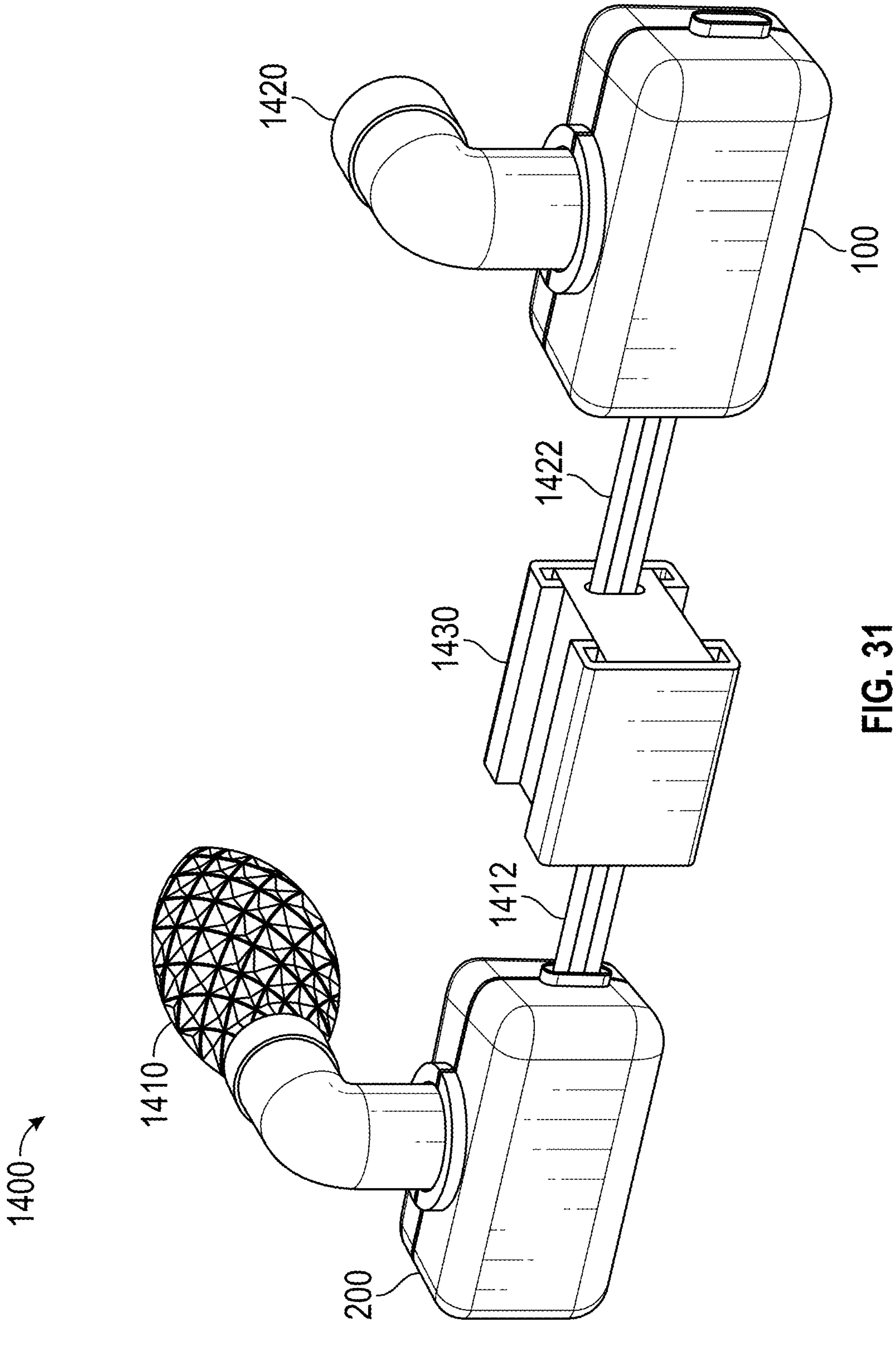
FIG. 31 illustrates another view of the lighting system of FIG. 29, according to an embodiment of the present disclosure.
Figure 32:
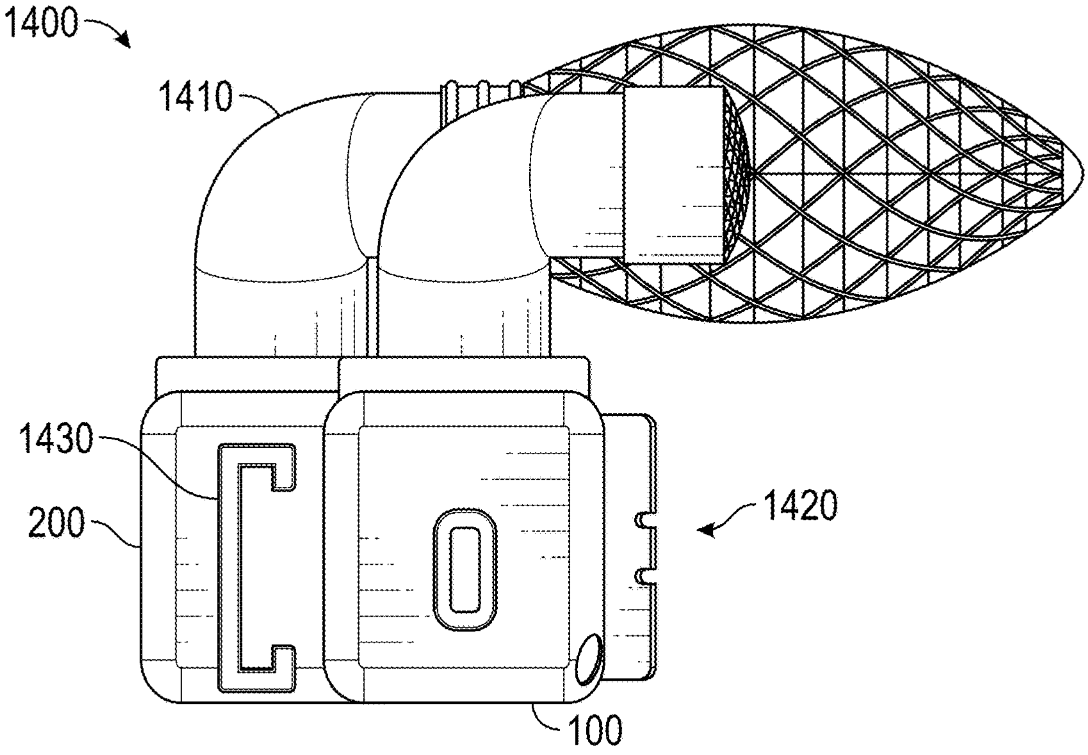
FIG. 32 illustrates another view of the lighting system of FIG. 29, according to an embodiment of the present disclosure.
Figure 33:
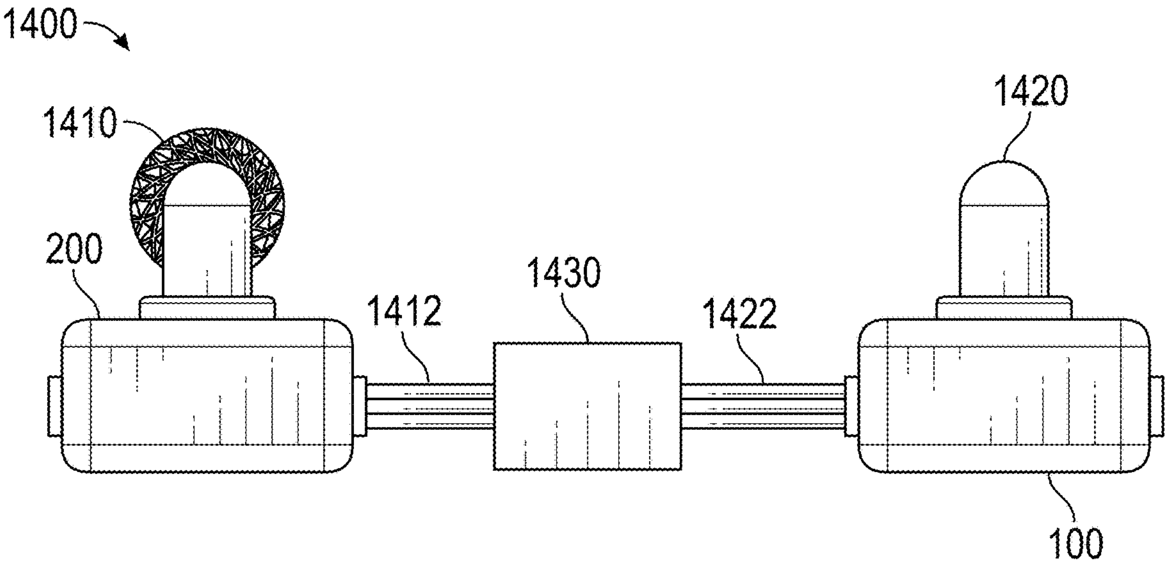
FIG. 33 illustrates another view of the lighting system of FIG. 29, according to an embodiment of the present disclosure.

FIGS. 38 to 41 illustrate another exemplary application of the light string of the present disclosure. Although shown employing lights 100, the lights 200, or other lights in accordance with the principles of the present disclosure, may be employed in the application shown and described with respect to FIGS. 38 to 41. In the example of FIGS. 38 to 41, the light string 10 may be installed on a house, of which the gutter 1600 is shown. The light string 10 may be installed on a rear side (not visible) of the gutter 1600 (e.g., on the interior side of the forward surface 1602 of the gutter 1600). The magnet 109 of the light string 10 may be installed directly to the rear side of the gutter 1600 if the gutter 1600 is formed of a magnetic material. Alternatively, a magnetic metal plate, such as metal plate 138 of FIG. 7, may be installed on the rear side of the gutter 1600. The magnet 109 may then be installed on the metal plate 138, as previously described. If metal plates 138 are employed, each light 100 of the light string 10 may be mounted to an individual metal plate 138. Alternatively, or additionally, any of the mounting assemblies described with respect to FIGS. 22A to 28B may be employed. The orientation of the light string 10 in FIGS. 38 to 41, may be "right side up" in the sense that the periscope 106 and the lens 108 hang vertically upward from the base 102. That is, the periscope 106 extends between the base 102 and the sky. Stated another way, the gutter 1600 is located between the periscope 106 and the ground surface. As shown in FIG. 29, each light 100 of the light string 10 may be spaced apart a predetermined distance. In one example, the predetermined distance is 6 inches, though other distances are contemplated.

In either of the arrangements of FIGS. 34 to 37 or FIGS. 38 to 41, the periscope 106 may rotated such that the lens 108 faces the desired direction. For example, if the light string extends around a corner of the soffit 1504 or a corner of the gutter 1600, the periscope 106 may be rotated such that on both of the sides of the corner, the light of the lens 108 is directed outward with respect to the house. Although shown on a soffit and gutter, other surfaces of the house and/or outdoor surfaces are contemplated (e.g., a garage, shed, sporting venue, deck, or porch railing, etc.).

Accordingly, the light string of the present disclosure provides a lighting set that may be employed outdoors or indoors. The light string is easily installed and removed, if desired (e.g., due to the magnetic connection with the surface on which the lights are mounted or due to one of the disclosed mounting assemblies). In some examples, the light string or a portion of the mounting assembly may be permanently installed and used year round. The inclusion of the periscope allows for the power source and wiring/cabling/power cord to be hidden behind a surface (e.g., behind the soffit or gutter). The periscope feature also allows the user to focus the light outward with respect to the mounting surface so that it radiates away from the mounting surface and/or the house to provide a brighter and more spectacular lighting effect. Furthermore, the user may rotate the periscope toward the house and project the light onto the house to provide a more subdued lighting effect. The inclusion of a hinge within the periscope may allow the lighting module to be moved into a variety of additional positions along the vertical axis, providing the user with even more lighting options. Any of the features of any embodiment of light, light string, or mounting assembly, may be interchanged with or replaced by any other feature of any other embodiment of light, light string, or mounting assembly.

The lens of the present disclosure may be threaded or screwed onto the periscope. In this manner, the lens may be swapped, replaced, or interchanged as desired by the user. Thus, a variety of covers may be attached to the periscope to create a number of different lighting effects.

Figure 42:
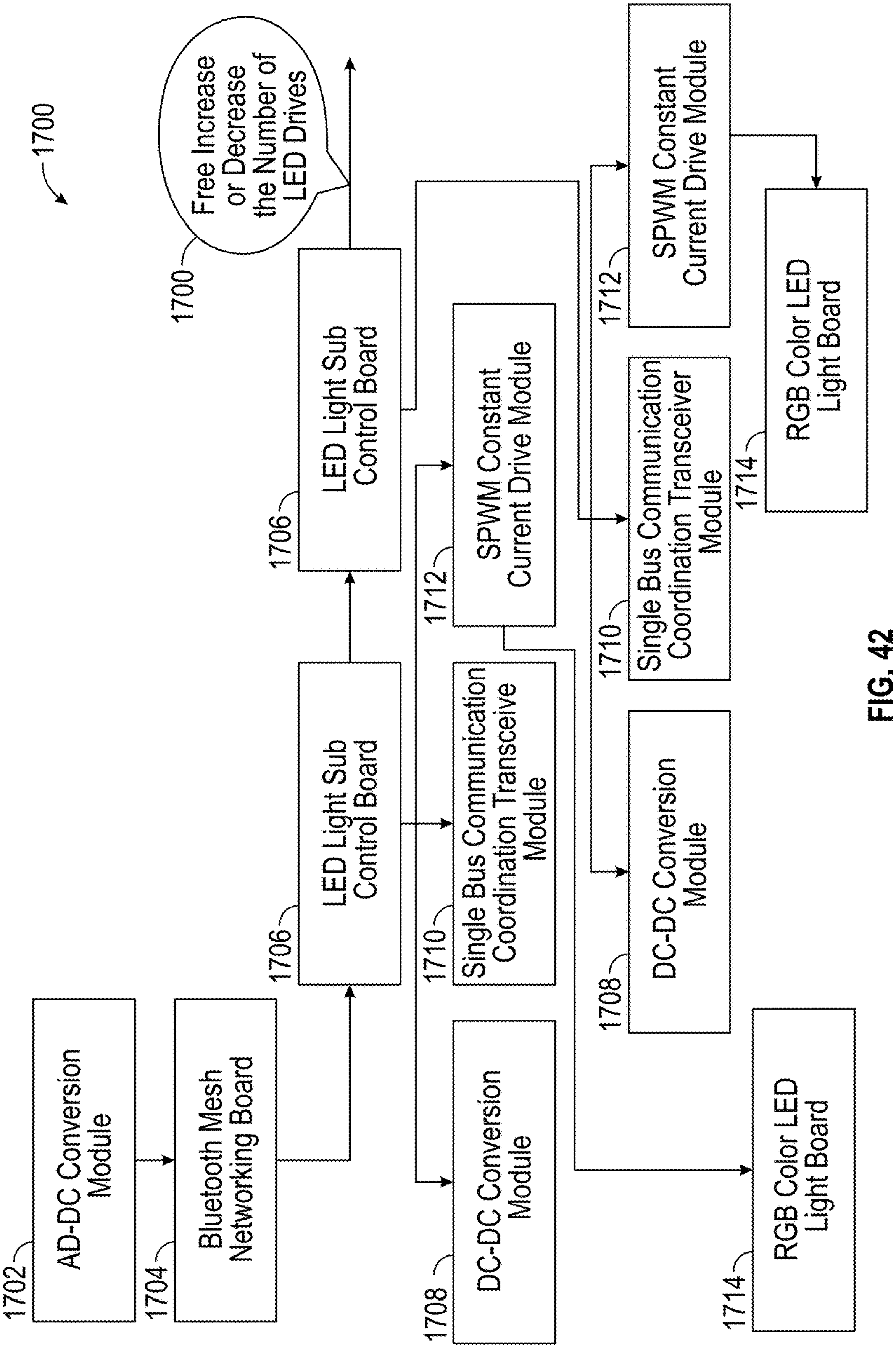
FIG. 42 illustrates an electric framework for a light string, according to an embodiment of the present disclosure.

The system of the present disclosure allows for the user to install the light string with easy installation and removal, but in a robust manner that allows the user to install the light string once and leave the light string up all year, without the obvious presence of traditional Christmas light bulbs. The present disclosure, therefore, provides a system that includes 180 degree angle swivel, interchangeable lenses, magnet backing, customizable length (e.g., through use of the light string connectors), 9" spacing or 6" spacing, heavy duty wiring and plastic for permanent use, water proof housings. In some examples, a spacer tool may be provided to enable users to measure to put the magnetic plate exactly where required. In some examples, a telescope grabber may be provided to enable users to put the lights on/off the soffit and also to turn the periscope. In some examples, the light system may be app enabled. That is, a computer app (e.g., smart phone or table app) may be provided to allow for controlling the lighting effect, the color, the timing, the on/off condition, etc., of the lights of the light string. In such examples, the light string is provided with control and communication components as required on the PCB. Referring to FIG. 42, an exemplary electric framework 1700 for the lights of the light string is shown. The electric framework 1700 includes an AC-DC conversion module 1702 for converting power provided to the light string. The AC-DC conversion module 1702 may be omitted when battery powered. Other conversion modules are contemplated to provide appropriate power to the light string. The electric framework 1700 includes a Bluetooth® mesh networking board 1704 to provide two-way communication with the light string and for allowing the light string to be controlled remotely via a computer application. Other communication boards are contemplated. The electric frame work includes an LED light sub control board 1706 for each of the lights of the light string. Each light sub control board 1706 may align generally with the PCB 116 (FIG. 5). Each light sub control board 1706 includes a DC-DC conversion module 1708, a single bus communication coordination transceiver module 1710, and a SPWM constant current drive module 1712. Each light sub control board 1706 is coupled to an RGB color LED light board 1714 (e.g., lighting module 104), which may be equipped with one or more LEDs, as previously described.

Figure 43:
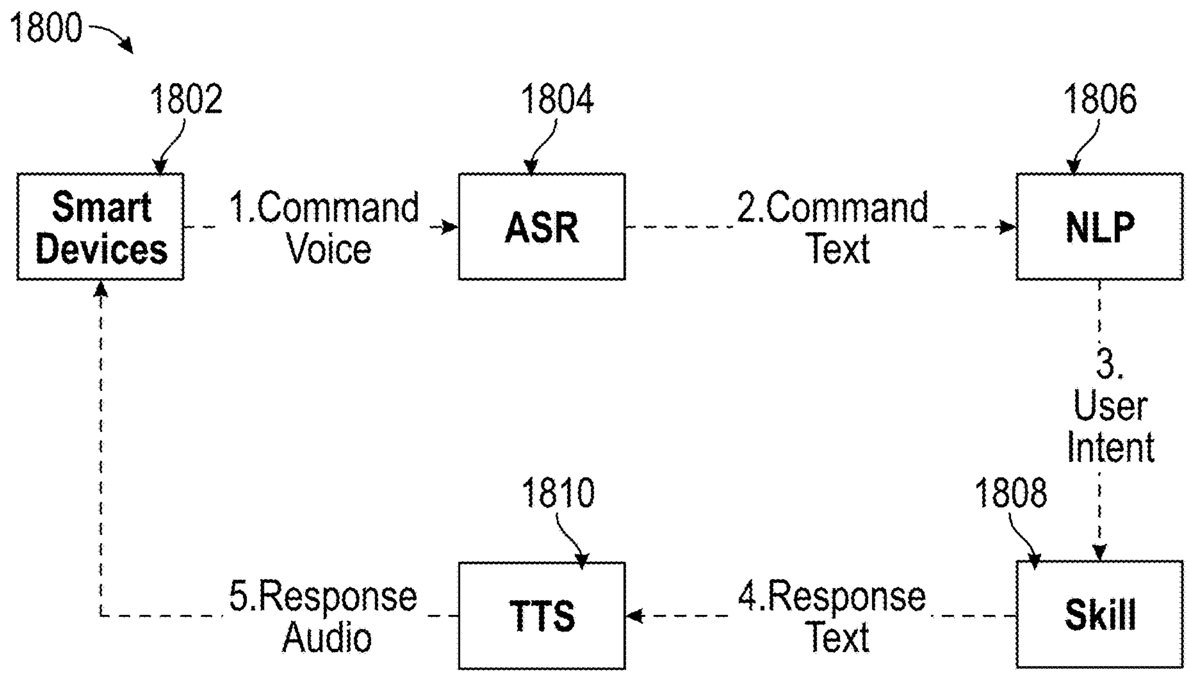
FIG. 43 illustrates an app enabled system for a light string, according to an embodiment of the present disclosure.
Figure 44:
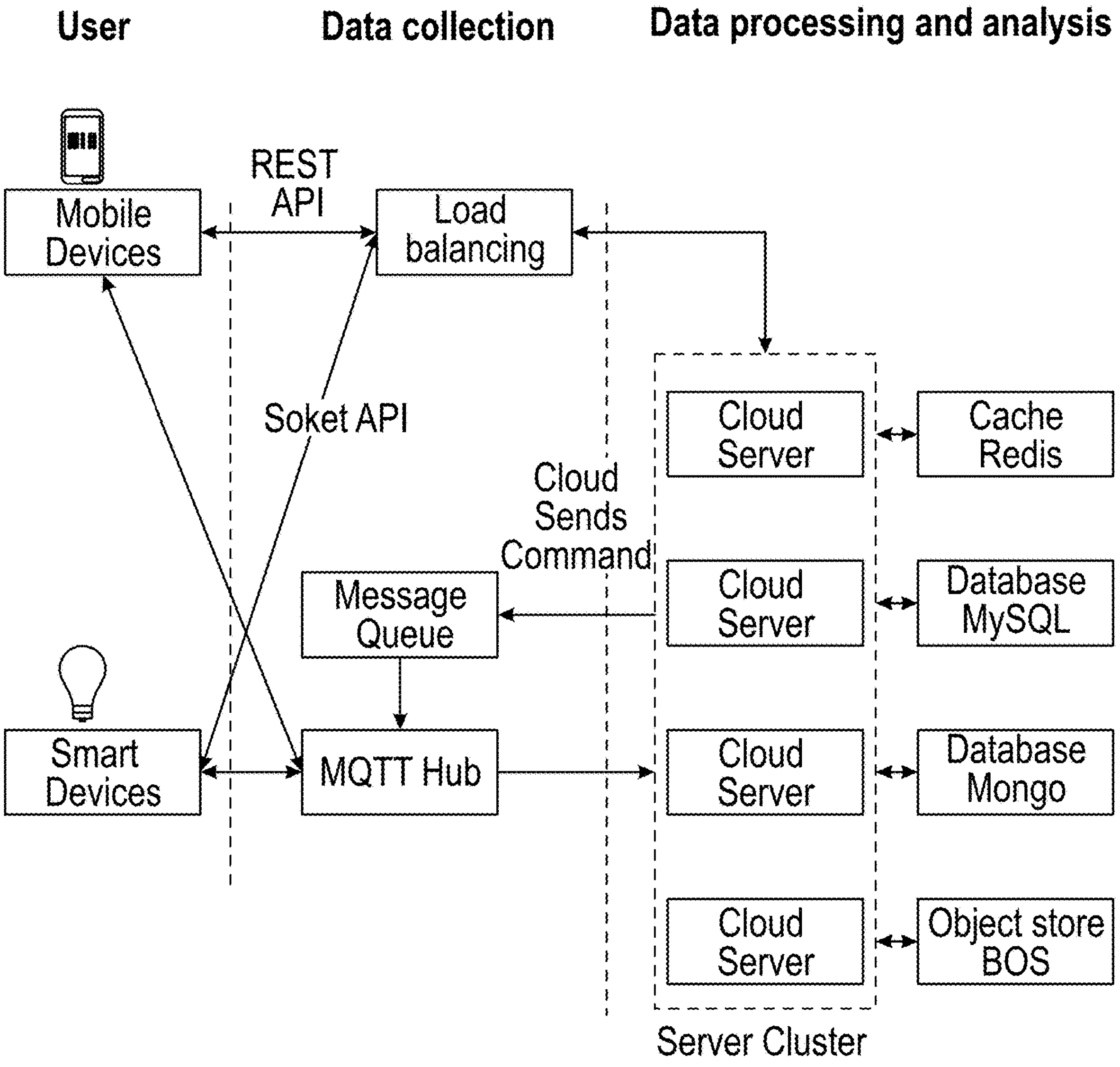
FIG. 44 illustrates a Bluetooth mesh, according to an embodiment of the present disclosure.

As mentioned previously, and as shown in FIG. 43, the light string of the present disclosure may be an app enabled system 1800. That is, the light string may be controlled via a computer application (e.g., a tablet, phone, or computer application). The light string may also be voice controlled, either directly or through the app. By connecting to a private cloud system with third-party voice devices (e.g., Amazon ECHO or Google Home) voice platforms, voice controls functions can be realized. The cloud remote control technology may be as shown in FIG. 44. For example, as shown in FIG. 43, the system 1800 may include one or more smart devices 1802. The smart device 1802 may issue an audio command (e.g., by way of the user) to an automatic speech recognition module 1804. The automatic speech recognition module 1804 detects the commend using natural language processing module 1806 to determine the user intent. The system 1800 than associates the command with a skill at 1808 (e.g., turning the lights on, off, changing a color or lighting effect, etc.) and repeats the skill back to the user with the text to speak module 1810.

The Bluetooth® mesh technology is an open-source protocol stack based on Bluetooth® mesh. The Bluetooth® mesh technology provides a low cost communication method, in Bluetooth Mesh network, the packet loss rate and data transmission delay of the whole data network are superior to other networking technologies, the products using The Bluetooth® mesh technology can connect with smartphones directly, the mobile phone can control the products flexibly, and data can be sent from any node to the entire network. When a node fails, the whole network can still maintain normal communication. The network has the advantages of convenient networking and strong anti-interference.

Accordingly, the aforementioned system provides do-it-yourself (DIY) functions. For example, users can customize the light effect of each light via App. The aforementioned system provides a cuttable feature, such that through the unique single-bus control protocol and data cascade forwarding function, the number of lights can be flexibly increased or decreased, and the system software can automatically identify the lights. The system provides a series connection for multiple lights. High voltage power input, through high efficiency DC-DC circuit design, to achieve lower energy efficiency, so that more lights can be connected in series. The system provides an automatic detection of light numbers. The unique software automatic detection algorithm combined with the hardware detection circuit can realize the main control board to automatically read the number of serial lights, so as to control the effect of light string accurately.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

What is claimed is:

1. A light string comprising:

a plurality of lights, each light of the plurality of lights having:

a base having a main surface and a bottom surface that is fixed in a substantially perpendicular position relative to the main surface;

a periscope extending from the bottom surface of the base, the periscope comprising:

a first section having a post, a hinge member that is received on the post, the hinge member including only a single hinge protrusion, a location of the hinge member being fixed relative to the first section, and a second section having an opening through which the post extends, the second section including a first groove and a second groove circumferentially spaced from the first groove;

an attachment mechanism provided on the main surface of the base, the attachment mechanism being configured to secure the base to an external surface; and a lighting module coupled to a distal end of the periscope; and a power cord serially connecting the plurality of lights, wherein the second section is movable relative to the first section to direct a light emanating from the lighting module in a first direction or a second direction different from the first direction, the single hinge protrusion being located in the first groove when the light emanating from the lighting module is directed in the first direction, the hinge protrusion being located in the second groove when the light emanating from the lighting module is directed in the second direction.

2. The light string of claim 1, further comprising a magnet embedded into the base, wherein the magnet is configured to secure the light to an external surface.

3. The light string of claim 1, wherein each light further comprises a mounting assembly configured to releasably secure the light to an external surface.

4. The light string of claim 1, wherein an angle defined between the first section and the second section is 90 degrees.

5. The light string of claim 1, wherein the hinge member is located between the first section and the second section.

6. The light string of claim 1, wherein the periscope is configured to rotate 180 degrees.

7. The light string of claim 1, wherein the first section is configured to rotate with respect to the base.

8. The light string of claim 1, wherein the lighting module comprises one or more LEDs.

9. The light string of claim 1, further comprising a lens coupled to the lighting module.

10. The light string of claim 9, wherein the lens is replaceable.

11. The light string of claim 9, wherein the lens is faceted, conical, or substantially flat.

12. The light string of claim 1, further comprising a printed circuit board within the base, the printed circuit board configured to control the lighting module.

13. The light string of claim 12, wherein the printed circuit board is controllable with a computer application and/or via voice command.

14. The light string of claim 1, wherein the periscope rotates with respect to the base and the hinge member allows for the periscope to hinge with respect to itself.

15. A lighting system comprising:

the light string of claim 1; and a mounting assembly configured to releasably secure the light string to an external surface.

16. The lighting system of claim 15, further comprising:

a second light string; and a connector configured to couple the second light string to the light string.

17. The lighting system of claim 16, wherein the light string and the second light string have different lenses or the same lenses.

18. The lighting system of claim 15, wherein the light string is configured to couple to a soffit or a gutter.

19. A light string comprising:

a plurality of lights, each light of the plurality of lights having:

a base having a main surface and a bottom surface that is fixed in a substantially perpendicular position relative to the main surface;

a periscope extending from the bottom surface, the periscope comprising:

a first section having a post;

a hinge member that is received on the post, the hinge member including only a single hinge protrusion, a location of the hinge member being fixed relative to the first section; and a second section having an opening through which the post extends, the second section including a first groove and a second groove circumferentially spaced from the first groove;

an attachment mechanism provided on the main surface of the base, the attachment mechanism being configured to secure the base to an external surface; and a lighting module coupled to a distal end of the periscope; and a power cord serially connecting the plurality of lights, wherein the periscope is moveable between two or more positions including:

a first position where the lighting module faces in a first direction, the single hinge protrusion being located in the first groove when the periscope is in the first position; and a second position where the lighting module faces a second direction, the second direction being different than the first direction, the single hinge protrusion being located in the second groove when the periscope is in the second position.

20. The light string of claim 19, wherein the second direction is 180 degrees from the first direction.

21. The light string of claim 19, further comprising a rotation assembly, wherein the periscope is movable between the first position and the second position via rotation of the rotation assembly with respect to a base of the light.

22. The light string of claim 19, further comprising a rotation assembly, the periscope movable between the first position and the second position via the rotation assembly, the hinge member, or both.

* * * * *